(12) United States Patent
Leduc et al.

(10) Patent No.: US 10,139,476 B2
(45) Date of Patent: Nov. 27, 2018

(54) ROTARY SCANNER, OPTO-MECHANICAL ASSEMBLY THEREFORE, AND METHOD OF MODIFYING AN ELEVATION ANGLE OF AN OPTICAL BEAM

(71) Applicant: INSTITUT NATIONAL D'OPTIQUE, Québec (CA)

(72) Inventors: Bruno Leduc, Québec (CA); Nichola Desnoyers, Québec (CA)

(73) Assignee: INSTITUT NATIONAL D'OPTIQUE, Québec (CA)

( * ) Notice: Subject to any disclaimer, the term of this patent is extended or adjusted under 35 U.S.C. 154(b) by 0 days.

(21) Appl. No.: 15/411,263

(22) Filed: Jan. 20, 2017

(65) Prior Publication Data

US 2017/0212222 A1    Jul. 27, 2017

Related U.S. Application Data

(60) Provisional application No. 62/341,425, filed on May 25, 2016, provisional application No. 62/281,645, filed on Jan. 21, 2016.

(51) Int. Cl.
*G01S 7/481*    (2006.01)
*G02B 26/10*    (2006.01)
*G01S 17/42*    (2006.01)

(52) U.S. Cl.
CPC ............ *G01S 7/4817* (2013.01); *G01S 17/42* (2013.01); *G02B 26/105* (2013.01)

(58) Field of Classification Search
CPC ............................. G01S 7/4817; G02B 26/105
USPC ......... 359/212.2, 221.1, 221.2, 226.1, 226.2; 356/3
See application file for complete search history.

(56) References Cited

U.S. PATENT DOCUMENTS

| | | | | |
|---|---|---|---|---|
| 5,438,449 A | * | 8/1995 | Chabot | G01C 21/00 359/211.1 |
| 5,546,217 A | * | 8/1996 | Greenway | G01S 7/481 359/196.1 |
| 6,107,770 A | * | 8/2000 | Jackson | B64G 1/28 244/165 |

(Continued)

OTHER PUBLICATIONS

RPLIDAR 360° Laser Scanner—RobotShop Website, Product Code: RB-Rpk-01, available at http://www.robotshop.com/ca/en/rplidar-360-laser-scanner.html. Retrieved from the Internet on Jan. 25, 2016.

*Primary Examiner* — Frank G Font
(74) *Attorney, Agent, or Firm* — Norton Rose Fulbright Canada LLP; Alexandre Daoust

(57) ABSTRACT

A rotary scanner is described. The rotary scanner includes a housing; a motor fixedly mounted relative to the housing; a structure mounted to the housing so as to be rotatable about a rotation axis by the motor; and a reflector assembly mounted to the structure via a pivot joint so as to be pivotable around a pivot axis between a rest angle and at least one other angle. The reflector assembly is biased to the rest angle and has a reflector plane parallel to the pivot axis. The rotary scanner also includes an optical source fixedly mounted relative to the housing and operable to emit an optical beam along the rotation axis and towards the reflector assembly during use; and a control interface allowing to control the rotation speed of the motor between a first rotation speed and at least one other rotation speed.

18 Claims, 15 Drawing Sheets

(56) References Cited

U.S. PATENT DOCUMENTS

| | | | | |
|---|---|---|---|---|
| 8,072,663 | B2* | 12/2011 | O'Neill | G02B 26/105 359/199.3 |
| 9,791,555 | B2* | 10/2017 | Zhu | G01S 17/08 |
| 2004/0114205 | A1* | 6/2004 | Richman | G02B 13/06 359/203.1 |
| 2005/0246065 | A1 | 11/2005 | Ricard | |
| 2010/0053715 | A1* | 3/2010 | O'Neill | G01S 7/4817 359/199.3 |
| 2010/0245801 | A1* | 9/2010 | Satzky | G01S 7/003 356/5.01 |
| 2013/0033732 | A1* | 2/2013 | Davis | G02B 26/085 359/198.1 |
| 2015/0062677 | A1* | 3/2015 | Armbruster | G02B 26/0858 359/199.4 |
| 2015/0092184 | A1* | 4/2015 | Schultz | G02B 26/101 356/5.01 |
| 2015/0096181 | A1* | 4/2015 | Plangger | G01S 7/4817 33/290 |
| 2016/0274224 | A1* | 9/2016 | Nordenfelt | G01C 15/002 |

* cited by examiner

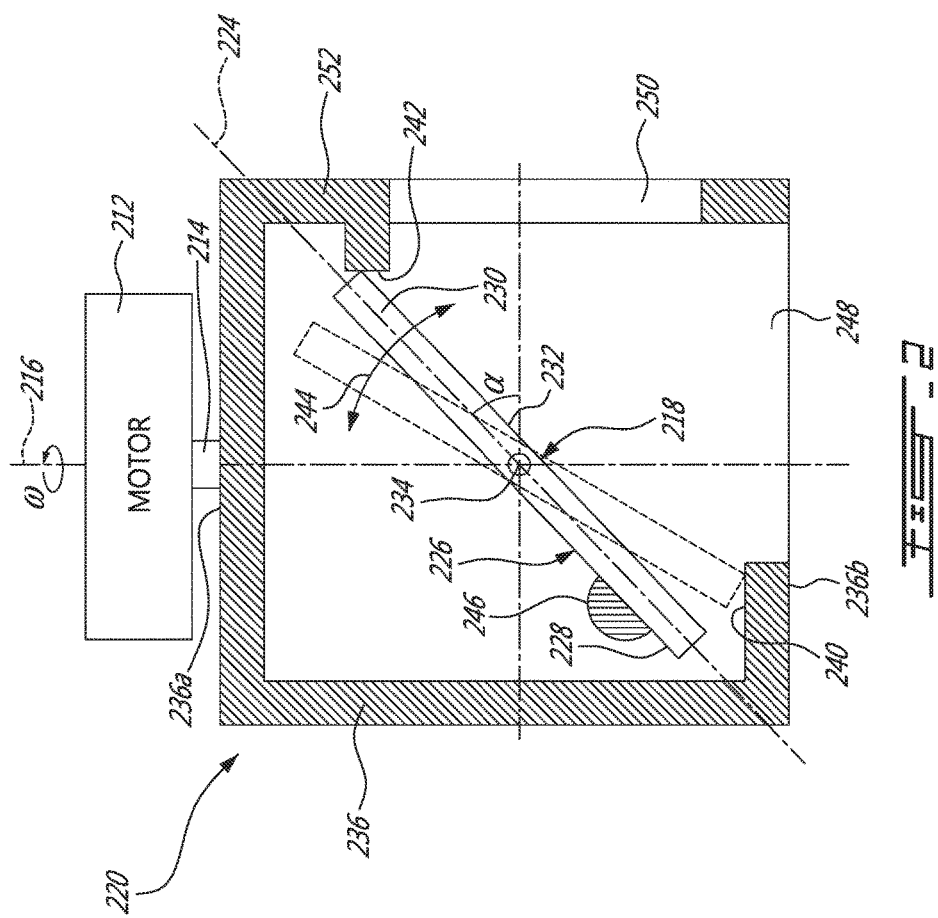

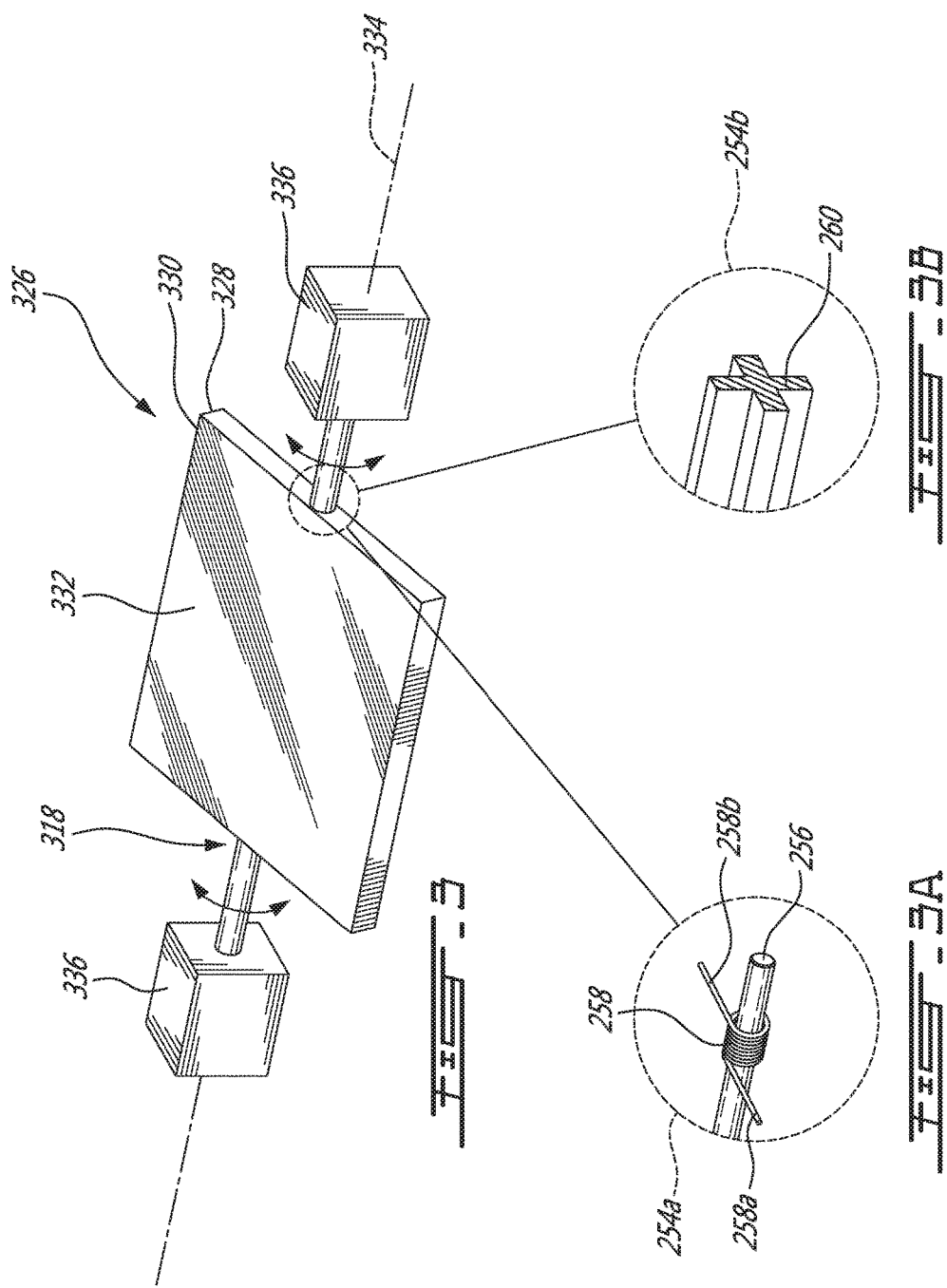

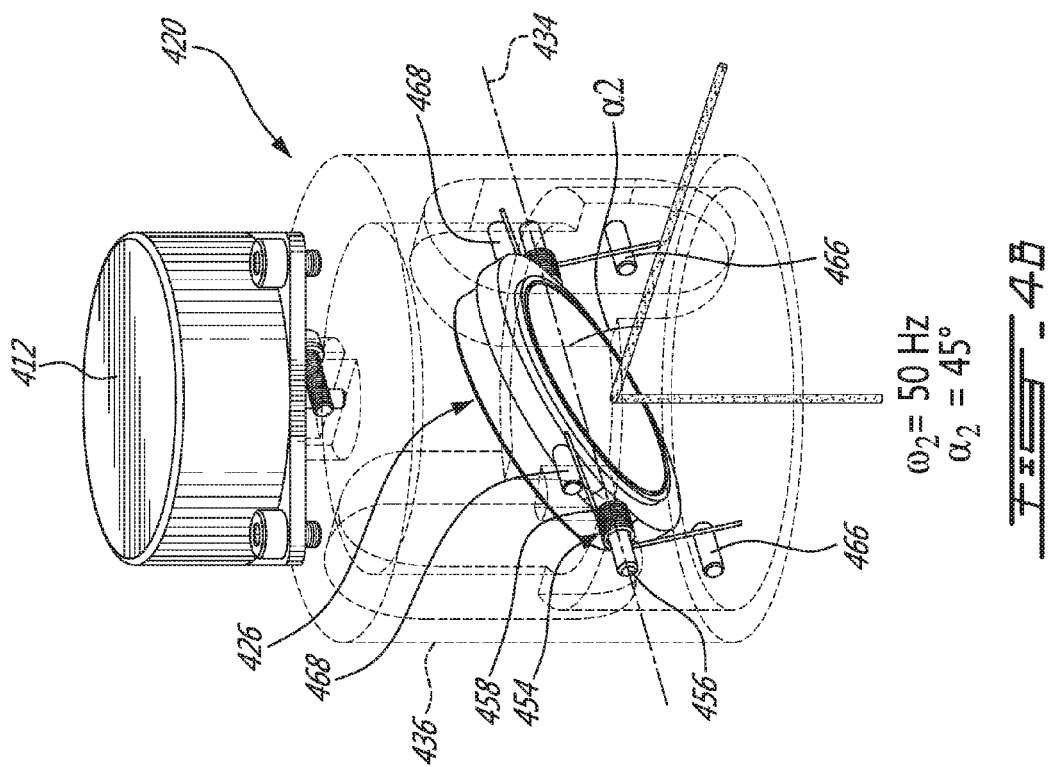
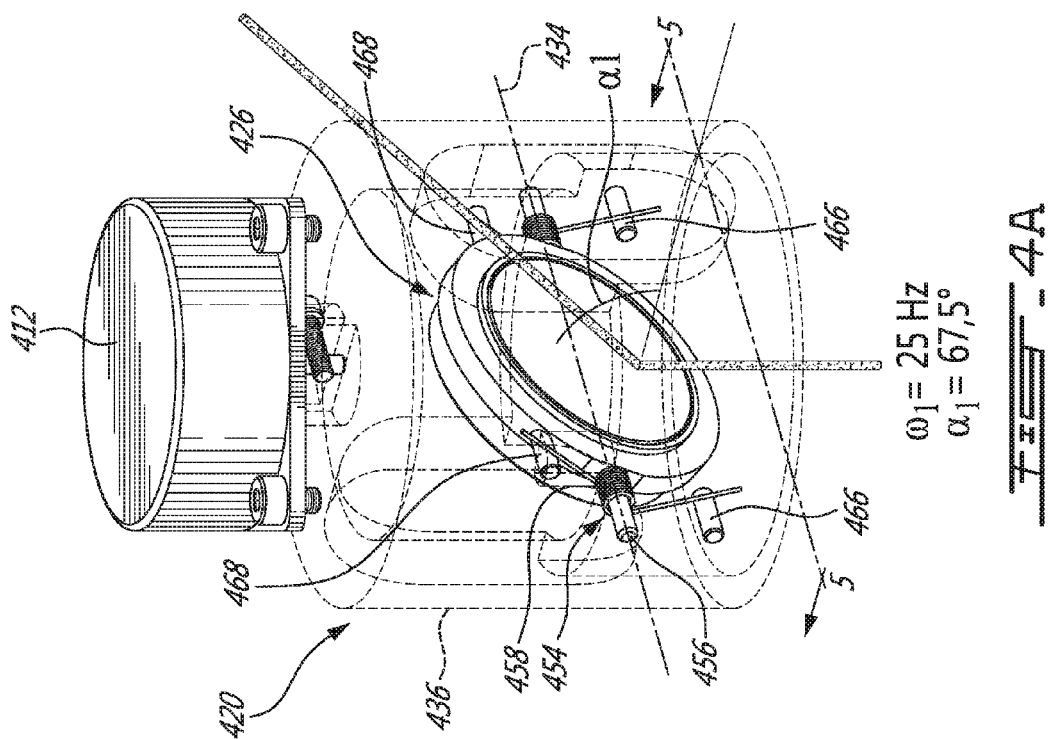

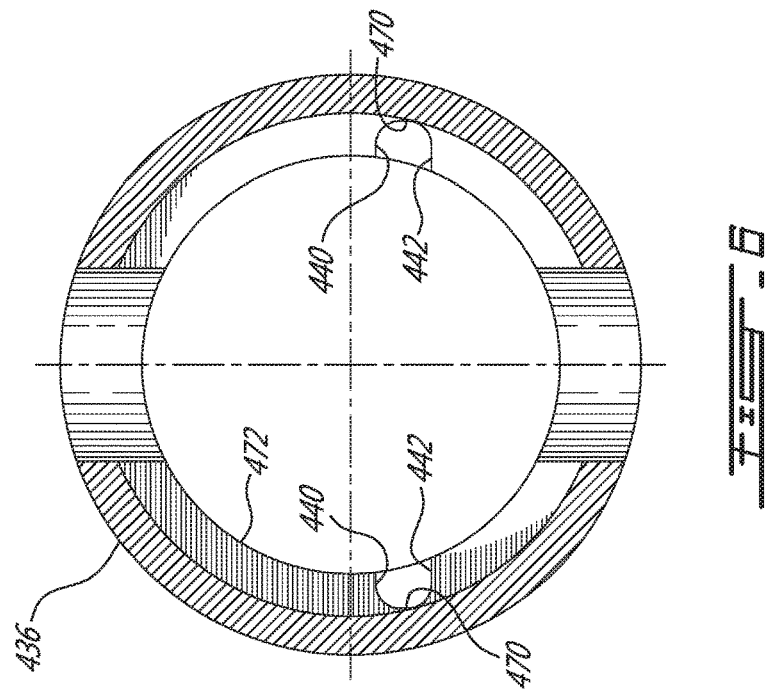
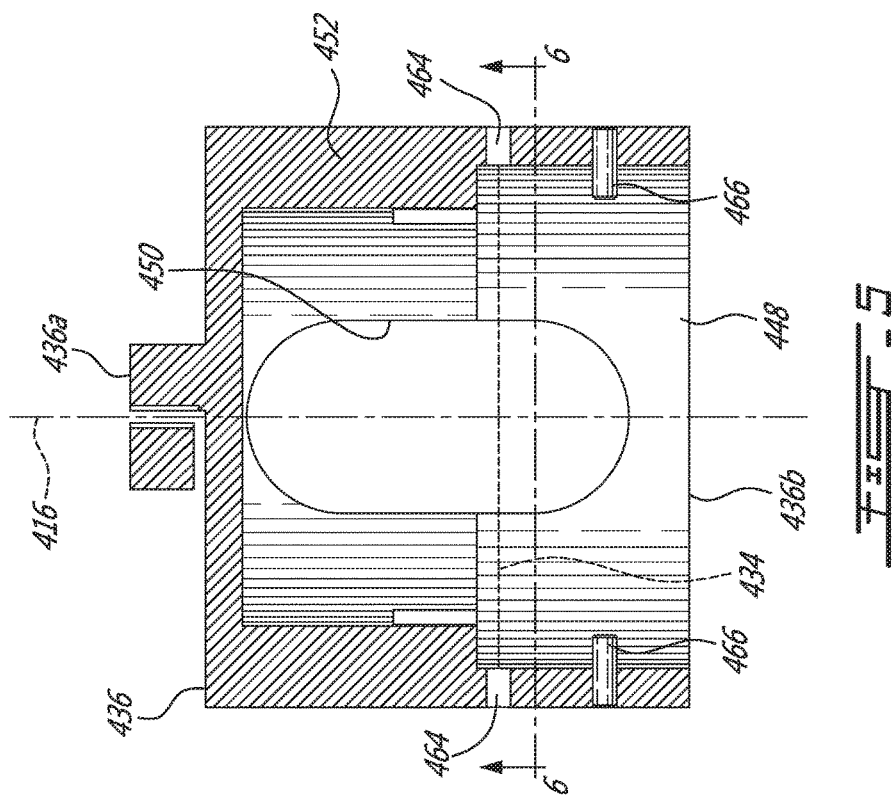

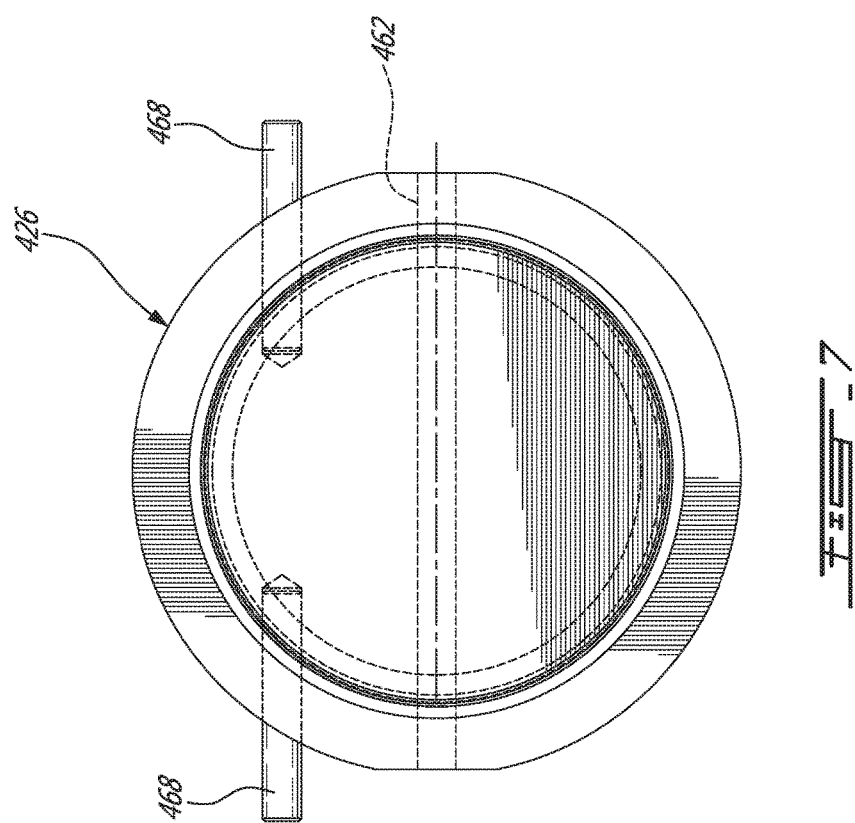

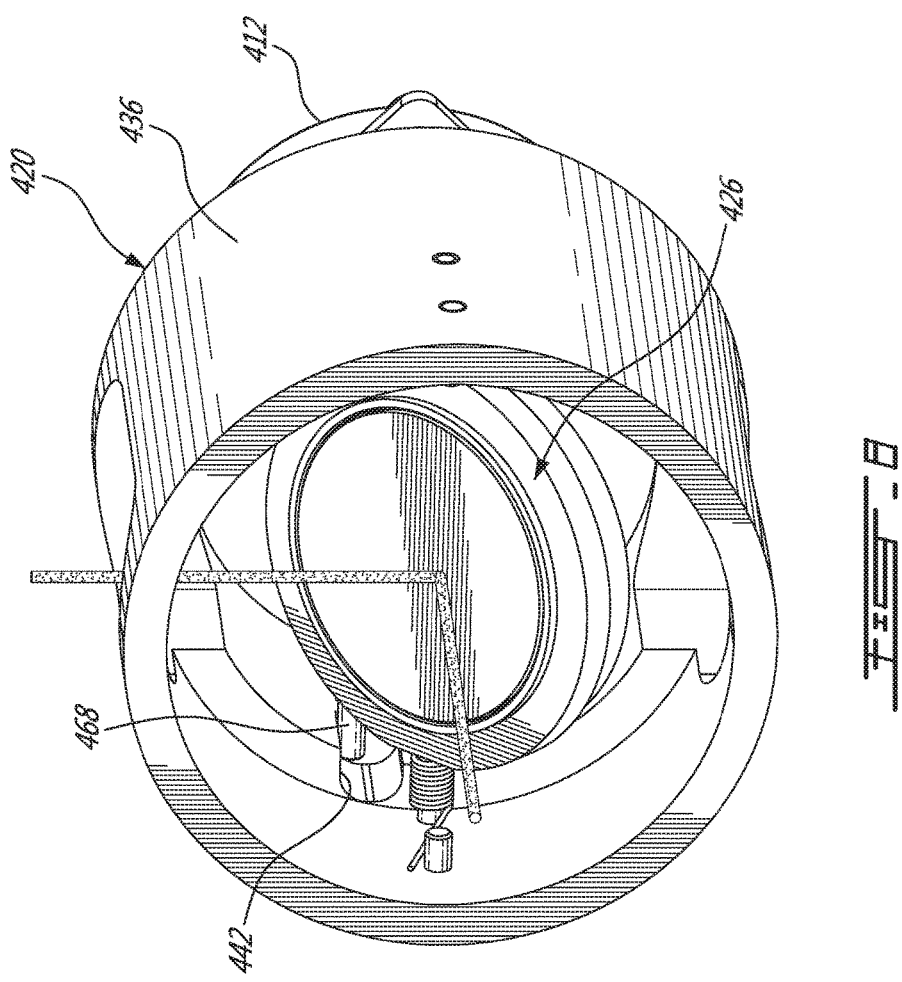

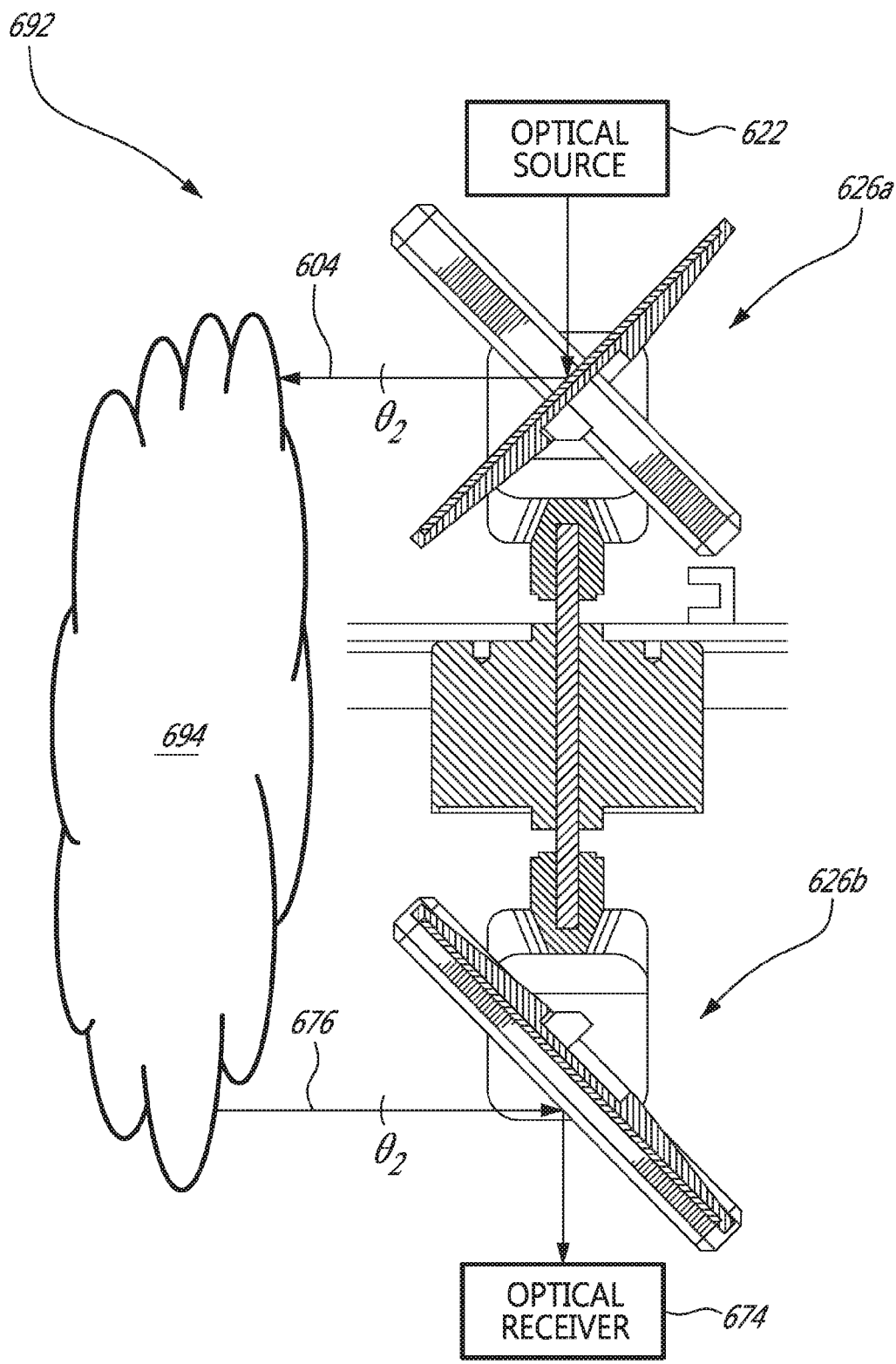

ROTARY SCANNER, OPTO-MECHANICAL ASSEMBLY THEREFORE, AND METHOD OF MODIFYING AN ELEVATION ANGLE OF AN OPTICAL BEAM

FIELD

The technical field generally relates to rotary scanners and more particularly relates to light detection and ranging (LIDAR) systems incorporating such rotary scanners.

BACKGROUND

In some "time-of-flight" LIDAR applications, a laser beam is projected towards objects in a surrounding environment, and a reflection of that laser beam is detected and analyzed to determine some properties of the objects.

In some other LIDAR applications, projecting the laser beam repeatedly around the whole horizon (i.e. along an azimuth angular span of 360°) was found useful to analyze a surrounding scene.

To do so, an example of a conventional laser projector is used. The conventional laser projector makes use of a fixed reflector set at a given elevation angle relative to the horizon. A typical elevation angle is 0°. The reflector is then rotated about a vertical axis at a rotation speed using a motor so that the pointing direction of the projected laser beam rotates to cover the horizon in a manner similar to that of the rotating light of a beacon.

Although existing laser projectors are satisfactory to a given degree, there remains room for improvement, especially in LIDAR applications wherein projecting optical beams at more than one elevation angle is necessary.

SUMMARY

There is a specific need in providing a rotary scanner which can project or receive an optical beam at a variable elevation angle and which is simple in construction, strong and cost effective. More specifically, there is a specific need for such a rotary scanner in the field of LIDAR systems.

In accordance with one aspect, there is provided a rotary scanner comprising: a housing; a motor fixedly mounted relative to the housing; a structure being rotatably mounted to the housing so as to be rotatable about a rotation axis by the motor during use; a reflector assembly being mounted to the structure via a pivot joint so as to be pivotable around a pivot axis between a rest angle and at least one other angle, the reflector assembly being biased to the rest angle, the pivot axis being perpendicular to the rotation axis, the reflector assembly having a reflector plane parallel to the pivot axis; an optical source fixedly mounted relative to the housing and being operable to emit an optical beam along the rotation axis and towards the reflector assembly during use; and a control interface allowing to control the rotation speed of the motor between a first rotation speed at which the centrifugal force operating against the reflector assembly is insufficient to overcome the bias, and at least one other rotation speed at which the centrifugal force operating against the reflector assembly overcomes the bias and pivots the reflector assembly from the rest angle to the at least one other angle.

In accordance with another aspect, there is provided a LIDAR system comprising: a rotary scanner as described herein wherein the reflector assembly is a first reflector assembly, the reflector plane is a first reflector plane and the pivot axis is a first pivot axis; an optical receiver fixedly mounted relative to the housing for receiving a reflection of the optical beam along the rotation axis; a second structure being rotatably mounted to the housing so as to be rotatable about the rotation axis by the motor during use; a second reflector assembly being mounted to the second structure via a second pivot joint so as to be pivotable around a second pivot axis between the rest angle and the at least one other angle based on the control interface, the second reflector assembly being biased to the rest angle by the second pivot joint, the second pivot axis being perpendicular to the rotation axis and parallel to the first pivot axis, the first and second reflector planes being perpendicular to one another as the first and second reflector assemblies are pivoted between the rest angle and the at least one other angle. The LIDAR system can further include electronics for driving the optical source, conditioning a signal detected by the optical detector, processing the detected signal and/or determining LIDAR measurements based on the processed signal.

In accordance with another aspect, there is provided a method of modifying an elevation angle of an optical beam rotating about a rotation axis, the elevation angle being relative to a reference plane, the method comprising: biasing a reflector assembly at a reflector angle relative to the reference plane; rotating the reflector assembly at a rotation speed about the rotation axis perpendicular to the reference plane, said biasing causing the reflector assembly to maintain the reflector angle during said rotating; propagating the optical beam towards the rotating reflector assembly thereby projecting the optical beam at an elevation angle therearound when the reflector assembly is biased at the reflector angle; and modifying said rotating to rotate the reflector assembly at at least one other rotation speed, said modifying causing the reflector assembly to pivot from the reflector angle to at least one other reflector angle and the elevation angle of the optical beam to be modified to at least one other elevation angle.

In accordance with another aspect, there is provided an opto-mechanical assembly comprising: a rotation axis; a structure being mountable to a motor for rotation about the rotation axis; and a reflector assembly being pivotally mounted to the structure via a pivot joint and being biased to a rest angle, the pivot joint having a pivot axis being perpendicular to the rotation axis, the reflector assembly having a reflector plane being parallel to the pivot axis; wherein a centrifugal force acting on the reflector assembly overcomes the bias to pivot the reflector assembly from the rest position to at least one other position when the structure rotates at a rotation speed exceeding a rotation speed threshold, the reflector plane forming a different angle relative to the rotation axis whether the reflector assembly is in the rest position or in the at least one other position.

Many further features and combinations thereof concerning the present improvements will appear to those skilled in the art following a reading of the instant disclosure.

DESCRIPTION OF THE FIGURES

In the figures,

FIG. 2 is a sectional view of an example of an opto-mechanical assembly mounted to a motor via a shaft;

FIG. 3 is an oblique view of an example of a reflector assembly pivotally mounted to a structure via a pivot joint extending on both sides of the reflector assembly;

FIG. 3A is a schematic view of an example of a first biasing member provided in the form of a torsion spring and pin assembly;

FIG. 3B is a schematic view of an example of a second biasing member provided in the form of a torsion bar;

FIG. 4A is an oblique view of another example of a rotary scanner which projects an optical beam at a first elevation angle;

FIG. 4B is an oblique view of the rotary scanner of FIG. 4A which projects an optical beam at a second elevation angle;

FIG. 5 is an axial sectional view of an example of a structure of the rotary scanner of FIG. 4A;

FIG. 6 is a cross-sectional view taken along lines 6-6- of FIG. 5;

FIG. 7 is a front view of an example of a reflector assembly of the rotary scanner of FIG. 4A;

FIG. 8 is an oblique view of the rotary scanner of FIG. 4B, taken from the bottom;

FIG. 12B is a sectional view of the LIDAR system of FIG. 11 showing the first and second reflector assemblies in a second position;

DETAILED DESCRIPTION

As may be appreciated by the skilled reader, a rotary scanner can be used in many applications for projecting an optical beam therearound or receiving light from a surrounding environment. For instance, it can be used for construction purposes (e.g., leveling) and it can also be used for light detection and ranging (LIDAR) systems. Only some possible embodiments are fully described herein. Embodiments of a rotary scanner will be described first and then, embodiments of a LIDAR system incorporating the scanner will be described.

Figure 1A:
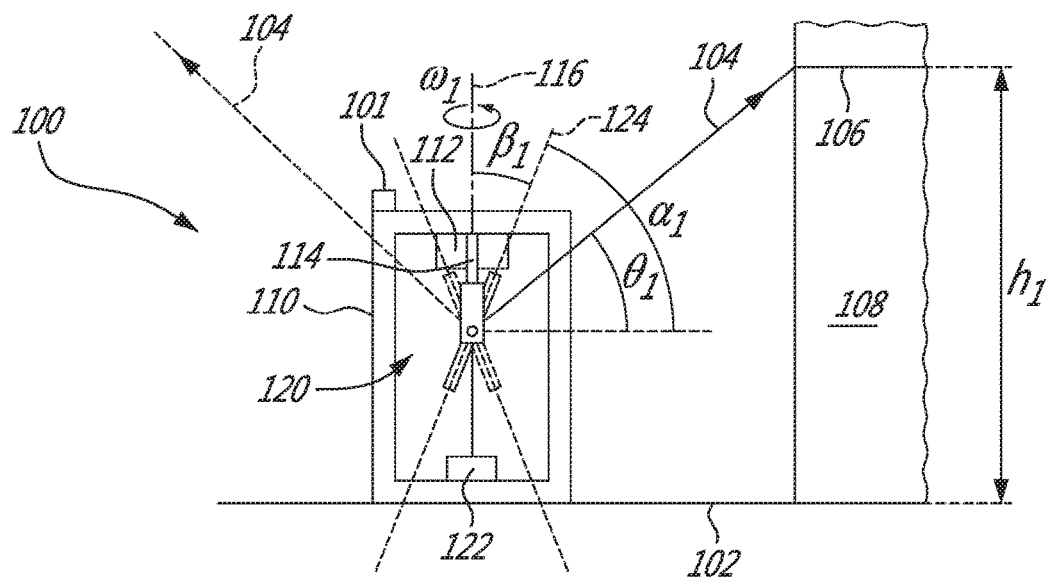
FIG. 1A is a side elevation view of an example of a rotary scanner which projects an optical beam at a first elevation angle towards a wall.
Figure 1B:
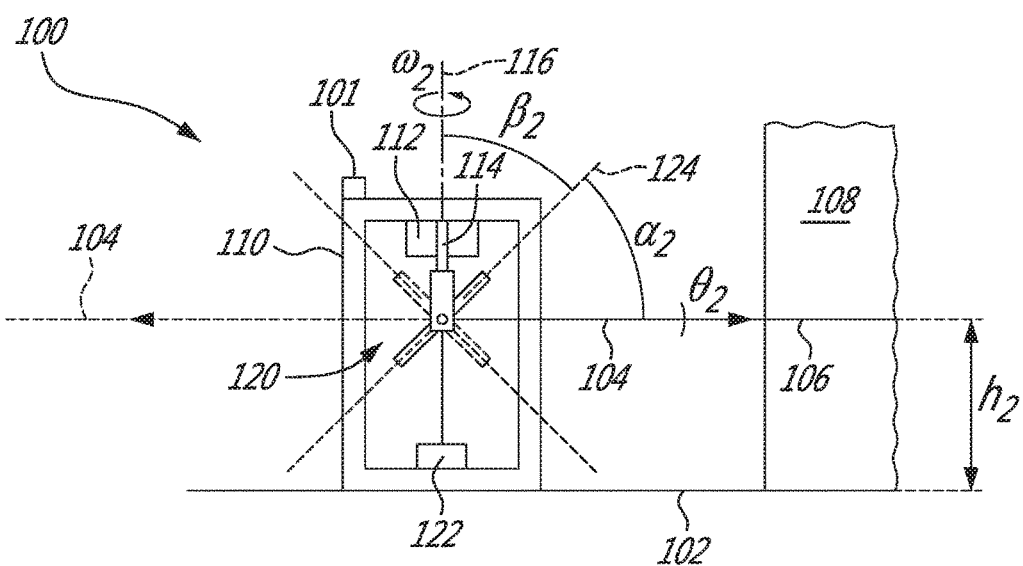
FIG. 1B is a side elevation view of the rotary scanner of FIG. 1A which projects an optical beam at a second elevation angle towards a wall.

FIGS. 1A and 1B show sectional views of an example of a rotary scanner 100 disposed on a reference plane 102. The rotary scanner 100 is configured to project an optical beam 104 outwardly therefrom and to rotate the projected optical beam 104 at a given rotation speed therearound to illuminate an optical path 106.

As will be apparent by a careful reading of the following examples, the rotary scanner 100 can be operated to project the optical beam 104 at a first elevation angle $\theta_1$ relative to the reference plane 102 whereas the same rotary scanner 100 can also be operated to project the optical beam 104 at a second elevation angle $\theta_2$ relative to the reference plane 102. In this example, the first elevation angle $\theta_1$ is about 45° whereas the second elevation angle $\theta_2$ is about 0°. These differing elevation angles $\theta_1$, $\theta_2$ allow the optical beam 104 to be projected at different heights h1, h2 of a wall 108, for instance.

More specifically, the rotary scanner 100 can be used to selectively project the optical beam 104 at one or more elevation angles $\theta$ relative to the reference plane 102 by selecting the rotation speed $\omega$ at which the optical beam is rotated.

Broadly described, the rotary scanner 100 has a housing 110 disposed on the reference plane 102. In this example, the housing 110 is made of a material which is optically transparent to the optical beam 104. The rotary scanner 100 has a variable rotation speed motor 112 (simply referred to as "the motor 112") mounted to the housing 110. The motor 112 has a shaft 114 which is rotatable about a rotation axis 116 upon actuation of the motor 112. The rotary scanner 100 has an opto-mechanical assembly 120 mounted to the shaft 114 of the motor 112, so as to be rotatable about the rotation axis 116 at one of a plurality of rotation speeds. An optical source 122 is mounted to the housing 110 and is adapted to emit an optical beam towards the opto-mechanical assembly 120. The rotary scanner 100 also has a control interface 101 allowing to control the rotation speed of the motor 112 between at least two different rotation speeds.

The opto-mechanical assembly 120 is used for rotating the optical beam 104 around the rotation axis 116. More specifically, the opto-mechanical assembly 120 has a structure which is mounted to the shaft 114 of the motor 112 such that it can rotate at the rotation speed. The opto-mechanical assembly 120 has a reflector assembly that is pivotally mounted to the structure. The reflector assembly is biased to a rest angle and pivotable between the rest angle and at least one other angle, e.g., a second angle. In this example, the reflector assembly is biased to the rest angle by the pivot joint. Therefore, the pivot joint is referred to as "the biased pivot joint" herein. The biased pivot joint has a pivot axis that is generally perpendicular to the rotation axis 116, and in this case, parallel to the reference plane 102. The biased pivot joint is flexible in torsion. In other words, it can have a certain elasticity and/or it can be "spring loaded". Using the intrinsic flexibility of the biased pivot joint can be interesting for imparting small torsional movements.

During use, the construction of the biased pivot joint allows the reflector assembly to be selectively pivoted between a rest position and a second position, causing the reflector to project the optical beam 104 at corresponding, different elevation angles $\theta$ relative to the reference plane 102, by varying a rotation speed of the shaft 114 of the motor 112. More specifically, the control interface allows to control the rotation speed of the motor 112 between a first rotation speed $\omega_1$ at which the centrifugal force operating against the reflector assembly is insufficient to overcome the bias of the pivot joint, and a second rotation speed $\omega_2$ at which the centrifugal force operating against the reflector assembly overcomes the bias and moves the reflector assembly into the second angle.

FIG. 1A shows the reflector assembly in the rest position when the opto-mechanical assembly 120 rotates at a first rotation speed $\omega_1$ which is equal or below the rotation speed threshold ($\omega_1 \leq \omega_t$) whereas FIG. 1B shows the reflector assembly in the second position when the opto-mechanical assembly 120 rotates at a second rotation speed $\omega_2$ which exceeds the rotation speed threshold ($\omega_2 > \omega_t$).

It will be understood that, as the structure rotates at a rotation speed which exceeds a rotation speed threshold (i.e. $\omega > \omega_t$), a centrifugal force acting on the reflector assembly overcomes a biasing force of the biased pivot joint to pivot the reflector assembly from the rest position to the second position. As shown, a reflector plane of the reflector assembly forms a different angle relative to the rotation axis 116, or equivalently relative to the reference plane 102, whether the reflector assembly is in the rest position or in the second position.

It will be understood that the centrifugal force is a force that acts on the reflector assembly to push it away from the rotation axis and that it exists in a rotating reference frame of the opto-mechanical assembly 120. As the rotation speed increases, the centrifugal force acting on the reflector assembly increases at a point where the centrifugal force overcomes the biasing force of the biased pivot joint. The rotation speed at which the centrifugal force begins to overcome the biasing force is referred to as the rotation speed threshold.

As shown in FIG. 1A, in the rest position, the optical beam 104 forms a first elevation angle $\theta_1$ of 45° relative to the reference plane 102, and a reflector plane 124 forms a first reflector angle (e.g. a rest angle) $\alpha_1$ of 67.5° relative to the reference plane 102. In FIG. 1B, in the second position, the optical beam 104 forms a second elevation angle $\theta_2$ of 0°, and the reflector plane 124 forms a second reflector angle (e.g. a second angle) $\alpha_2$ of 45°.

It will be understood that characterizing the elevation angle $\theta$ of the optical beam 104 relative to the reference plane 102 is equivalent to characterizing a zenith angle of the optical beam 104 relative to the rotation axis 116 since the elevation angle $\theta$ and the zenith angle $\beta$ are complementary angles (i.e. $\theta + \beta = 90°$).

It was found that the mathematical relationship between the rotation speed $\omega$ and the reflector angle $\alpha$ can be proportional. For instance, it was found that in some embodiments, the mathematical relationship is non-linear as the centrifugal force varies to the squared with the rotation speed $\omega$ and it also varies as a function of a moment of inertia of the opto-mechanical assembly 120 which varies according to the sine of the reflector angle $\alpha$. Thus, without the addition of the biasing of the pivot joint, the centrifugal force dominates rapidly on the gravitational force (e.g., at RPM as low as 70). In some cases, the mathematical relationship can be determined by simulation using an iterative loop algorithm wherein such iterative loop algorithm can be performed using a CAD software equipped with a dynamic simulation module of rigid bodies. Accordingly, for a given application requiring a specific mathematical relationship between the rotation speed $\omega$ and the reflector angle $\alpha$, the iterative loop algorithm can allow testing of different designs of the opto-mechanical assembly 120 in order to determine which one of the tested designs is best suited for the given application. It is noted that once built in accordance with an already test design, the resulting opto-mechanical assembly 120 may require no or only some fine-tuning.

As it will be understood, the motor 212 has the control interface 101 which allows control of the rotation speed of the motor between more than one rotation speeds. In the illustrated embodiment, the control interface 101 is provided in the form of a potentiometer that can be actuated to vary the rotation speed as desired. In another embodiment, the control interface includes a processor. In this latter embodiment, an external computer can send control signals to the processor such that it can vary the rotation speed accordingly. The control interface can include a computer-readable memory on which is stored a rotation speed control program. As may be appreciated by the skilled reader, any suitable control interface can be used, and the specificities of the control interface can be chosen by the designer as a function of the intended application.

In this disclosure, the expression "optical beam" is meant to encompass embodiments where the optical beam is generated by a laser or a light-emitting diode (LED), where the optical beam is emitted in either continuous wave (CVV) or pulsed regime and/or where the optical beam has an optical energy distributed in any of the different regions of the electromagnetic spectrum (e.g., in the visible region, in the infrared region). Therefore, the expression "rotary scanner" is meant to encompass embodiments where the rotary scanner is a laser rotary scanner. Also, the expression "rotary scanner" is meant to encompass embodiments where the rotary scanner is used as a rotary projector to project an optical beam therearound as well as embodiments where the rotary scanner is used as a rotary optical receiver to receive light from a surrounding environment. In some embodiments, especially in LIDAR systems, the rotary scanner can include both a rotary projector and a rotary receiver. Further, the word "perpendicular" is meant to be construed broadly so as to encompass situations where the pivot axis and the rotation axis is substantially perpendicular.

FIG. 2 shows a sectional view of another example of an opto-mechanical assembly 220. Like elements will bear like reference numerals, but in the 200 series. As depicted, the opto-mechanical assembly 220 is connected to the shaft 214 of the motor 212, and the rotation axis 216 coincides with that of the shaft 214. As it can be seen, the opto-mechanical assembly 220 has a reflector assembly 226 which can pivot between the rest position (shown in dash lines) and the second position (shown in solid lines).

The reflector assembly 226 has a body 228, a reflector receiver 230 which is mounted to the body 228, and a reflector 232 such as a mirror mounted to the reflector receiver 230. For ease of reading, the reflector 232 is said to extend in the reflector plane 224 which is parallel to a pivot axis 234 (shown perpendicular to the page in FIG. 2).

It is contemplated that the optical beam emitted by an optical source is generally directed towards the reflector assembly 226 such that it can project the optical beam at a desired elevation angle relative to the rotation axis 216 and that rotation of the reflector assembly 226 causes rotation of the optical beam around the opto-mechanical assembly 220.

In this embodiment, the opto-mechanical assembly 220 has a structure 236 provided in the form of an enclosure having a first end 236a mounted to the shaft 214 and encloses the reflector assembly 226. As will be described in greater detail hereinbelow, the reflector assembly 226 is pivotally attached to the structure 236 via a biased pivot joint 218. In this embodiment, the biased pivot joint 218 pivots about the pivot axis 234 which is generally perpendicular to the rotation axis.

The structure 236 is provided with one or more first stoppers 240 (referred to as "the first stopper 240") inwardly protruding from the structure and towards the reflector assembly 226 to maintain it in the rest position (see the reflector assembly 226 shown in dashed lines) when the rotation speed ω of the opto-mechanical assembly 220 is equal or less than the rotation speed threshold. In other words, the biasing force of the bias of the pivot joint 218 that acts on the reflector assembly 226 is not overcome by the centrifugal force acting on the reflector assembly so the biasing force of the bias of the pivot joint 218 pushes the reflector assembly 226 against the first stopper 240.

In this embodiment, the structure 236 is provided with one or more second stoppers 242 (referred to as "the second stopper 242") which inwardly protrude from the structure 236 and towards the reflector assembly 226 to maintain it in the second position when the rotation speed ω of the opto-mechanical assembly 220 exceeds the rotation speed threshold. In this case, the biasing force of the bias of the pivot joint 218 that acts on the reflector assembly 226 is overcome by the centrifugal force acting on the reflector assembly 226 so the centrifugal force pushes the reflector assembly 226 against the second stopper 242.

Accordingly, the first and second stoppers 240 and 242 can obstruct a pivot path 244 of the reflector assembly 226 at predetermined positions of the pivot path 244, and form corresponding limits of the pivot path 244. Each of the first and second stoppers 240 and 242 can thus be used to receive a pressure from the reflector assembly 226 whether it is in the rest position or in the second position. The stoppers 240 and 242 shown are provided as example only. Any other suitable types of stoppers can be used.

In alternate embodiments, the opto-mechanical assembly can include a structure having a plurality of incrementally-spaced stoppers or indexes. In these embodiments, increasing the rotation speed of the opto-mechanical assembly above a second rotation speed threshold can cause the reflector assembly to move from the second position to a third position and so forth. An example of such an opto-mechanical assembly is described below with reference to FIG. 15.

Still referring to FIG. 2, the reflector assembly 226 has one or more eccentric weights 246 (referred to as "the weight 246") mounted to the reflector assembly 226 and distal from the pivot axis 234 in order to increase the magnitude of the centrifugal force that will act on the reflector assembly 226 when it rotates. By doing so, the rotation speed threshold may be reduced. This, or alternately modifying a stiffness constant of the biased pivot joint 218, can be useful when the moment of inertia of the reflector assembly 226 does not allow satisfactory pivoting between the rest position and the second position. In any case, the skilled reader will appreciate that a calibration method (using different eccentric weights and/or a different type of pivot joint) can be used to achieve satisfactory embodiments for many applications.

In this embodiment, the structure 236 is made of an optically opaque material such that windows are required to receive the optical beam from an optical source and to project the optical beam outwardly from the opto-mechanical assembly 220. For instance, in this case, the structure 236 has a second end 236b, opposite the first end 236a, with a beam receiving window 248 to receive the optical beam. The structure 236 also has a beam projecting window 250 defined in a lateral wall 252 of the structure 236 allowing the reflector assembly 226 to project the incoming optical beam outwardly from the opto-mechanical assembly 220. The windows 248, 250 can be provided in the form of apertures or be made of an optically transparent material (e.g., glass).

FIG. 3 shows an example of a reflector assembly 326 pivotally mounted to portions of a structure 336. Like elements will bear like reference numerals, but in the 300 series. In this embodiment, the reflector assembly 326 has a body 328, a reflector receiver 330 mounted to the body 328, a reflector 332 mounted to the reflector receiver 330. More specifically, the reflector 332 is provided in the form of a reflective coating deposited on a glass slide and the like. Any other suitable reflector assembly can be used. Other examples of reflector assemblies are provided in fuller detail hereinbelow. The reflector 332 can include any form of reflective surface, including reflective or refractive surface. Accordingly, the term "reflector" is used for the sole purpose of simplicity.

FIGS. 3A and 3B show exemplary first and second biasing members 254a and 254b that can be used to pivotally mount the reflector assembly to the structure.

As depicted in FIG. 3A, the first biasing member 254a includes a pin 256 around which is mounted a torsion spring 258 (e.g., a torsion spring and pin assembly). The torsion spring 258 has first and second spring ends 258a and 258b which are to be spring loaded between the structure and the reflector assembly. More specifically, during use, one of the first and second spring ends 258a and 258b is contiguous to the structure, and the other one of the first and second spring ends 258a and 258b is contiguous to the reflector assembly. Any suitable spring such as an extension spring may be used. Examples of such torsion springs can be purchased from Century Spring Corp (product numbers TO-5000LS and TO-5000RS).

As shown in FIG. 3B, the second biasing member 254b includes a torsion bar 260 which is twistable about the pivot axis to pivot the reflector assembly between the rest position and the second position. In this example, the torsion bar 260 has a cross sectional area having a cross shape.

Any other suitable types of biasing members can be provided.

Figure 9:
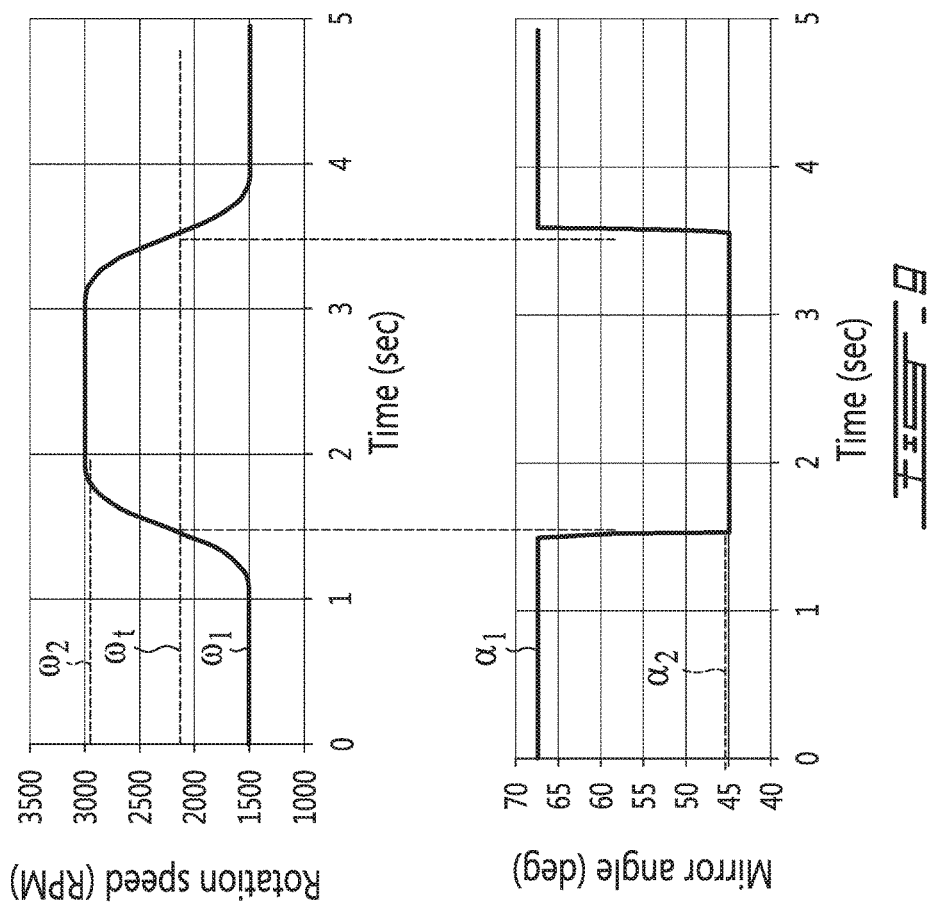
FIG. 9 is a pair of graphs showing the relationship between the rotation speed and the reflector angle as a function of time.

FIGS. 4A, 4B, 5, 6, 7, 8 and 9 show another example of an opto-mechanical assembly 420. Like elements will bear like reference numerals, but in the 400 series. More specifically, FIGS. 4A and 4B show the reflector assembly 426 when in the rest position and in the second position, respectively. As will be described in greater detail hereinbelow, FIG. 5 shows an axial section of the structure 436 of the opto-mechanical assembly 420 taken along section line 5-5 of FIG. 4A, FIG. 6 shows a transversal cross section of the structure 436 taken along section line 6-6 of FIG. 5, FIG. 7 shows a front view of the reflector assembly 426 and FIG. 9 shows an oblique bottom view of the opto-mechanical assembly 420. The motor 412 can be an electric motor, an example of which can be purchased from Micromo (product number 2610T006). Of course, other examples of electric motors, e.g., including more affordable ones, can be used.

More specifically, FIG. 4A shows the reflector assembly 426 in the rest position when opto-mechanical assembly 420 rotates at a first rotation speed $\omega_1$ of 25 Hz which is equal or below the rotation speed threshold ($\omega_1 \leq \omega_t$) whereas FIG. 4B shows the reflector assembly 426 in the second position when the opto-mechanical assembly 420 rotates at a second rotation speed $\omega_2$ of 50 Hz which exceeds the rotation speed threshold ($\omega_2 > \omega_t$). Similarly to the embodiment shown in FIGS. 1A and 1B, the first and second reflector angles $\alpha_1$ and $\alpha_2$ in this example are 67.5° and 45°, respectively. It is noted that the opto-mechanical assembly 420 is balanced to avoid vibration when rotating at such relatively high rotation speeds.

Referring now to FIG. 5, the structure 436 has the first end 436a mountable to a shaft of a motor during use. The structure 436 has a second open end 436b, opposite the first end 436a, for receiving an optical beam at the beam receiving window 448. As shown, the structure 436 has a U-shape which defines a lateral wall 452 having two prongs between which the pivot axis 434 extends and to which are mounted the two biasing members 454. The structure 436 has the beam projecting window 450 defined in the lateral wall 452 of the structure 436. The beam projecting window 450 extends axially along the rotation axis 416 in order to let pass the projected optical beam notwithstanding the elevation angle at which it is projected.

Referring back to FIGS. 4A and 4B, there is shown that the reflector assembly 426 is pivotally mounted to the structure via a pivot joint 318 including two biasing members 454 similar to the one described with reference to FIG. 3A.

In this example, the two biasing members 454 include a common pin 456, collinear with the pivot axis 434, being rotatably received in a pin channel 462 of the reflector assembly 426 extending diametrically therethrough (see FIG. 7). The pin 456 has a length greater than a diameter of the reflector assembly 426 such that two ends of the pin 456 outwardly protrude from the reflector assembly 426 when the pin 456 is received in the pin channel. Each of the protruding ends of the pin 456 is fixedly received in a respective one of two pin receiving holes 464 defined at opposite portions of the structure 436 along the pivot axis 434 (see FIG. 5) thereby allowing the reflector assembly 426 to pivot around the pivot axis 434. In an alternate embodiment, each biased pivot joint may have its own pin, and the pin channel may not extend across the whole diameter of the reflector assembly.

Each biasing member 454 includes a torsion spring 458 around each protruding end of the pin 456, between the structure 436 and the reflector assembly 426. The first spring end of each torsion spring 458 is abutted on a first peg 466 inwardly protruding from the structure 436 towards the rotation axis 416 (see also FIG. 5) whereas the second spring end of each torsion spring 458 is abutted on a second peg 468 outwardly protruding from the reflector assembly 426 (see also FIG. 7). The first and second spring ends are positioned to allow spring loading of the reflector assembly 426 relative to the structure 436 via the torsion spring 458. It is noted that the first and second pegs 466 and 468 can be provided in the form of any suitable type of anchor.

As will be understood, when the opto-mechanical assembly rotates at a rotation speed below or equal the rotation speed threshold, the torsion spring 458 pushes the second peg 468 of the reflector assembly 426 against the first stopper 440 of the reflector assembly 426 to be maintained in the rest position, as shown in FIGS. 6 and 8. When the opto-mechanical assembly 420 rotates at a rotation speed which exceeds the rotation speed threshold, the torsion spring 458 pushes the second peg 468 of the reflector assembly 426 against the second stopper 442 to maintain the reflector assembly 426 in the second position.

As best seen in FIG. 6, the second peg extends towards the structure 436 and is provided between first and second stoppers 440 and 442 of the structure 436. In this case, the first and second stoppers 440 and 442 are provided in the form of a peg receiving cavity 470 defined in an inner surface 472 of the structure 436. The peg receiving cavity 470 is circumferentially wider than a diameter of the second peg to allow it to move from the first stopper 440 to the second stopper 442 during use.

FIG. 8 shows a configuration of the opto-mechanical assembly 420 where the second peg 468 is abutted on the second stopper 442 of the structure 436, thereby maintaining the reflector assembly 426 in the second position.

FIG. 9 represents graphs showing that, upon varying a rotation speed (here in rotation per minute (RPM) units) of the reflector assembly, a reflector angle of the reflector assembly can be pivoted between the rest position ($\alpha_1$=67.5°) to the second position ($\alpha_2$=45°) accordingly. More specifically, past the first second of this rigid body dynamics computer simulation, the rotation speed is increased from a first rotation speed $\omega_1$ of 1500 RPM to a second rotation speed $\omega_2$ of 3000 RPM, wherein the rotation speed threshold is about 2250 RPM or 37.5 Hz in this example, so that the reflector assembly pivots from the rest position to the second position (from $\alpha_1$ to $\alpha_2$). Past the third second of this experiment, the rotation speed is decreased from $\omega_2$ of 3000 RPM to $\omega_2$ of 1500 RPM which causes the reflector assembly to pivot from the second position back to the rest position. Depending on the construction of the opto-mechanical assembly, the rotation speed threshold can vary. It also shows that the transition of the reflector assembly between the rest position and the second position can be reversible.

A LIDAR can be used to project an optical beam towards a scene in a given direction and to detect a reflection of that optical beam from the scene in a parallel but opposite direction. To do so, the LIDAR is generally equipped with an optical source (e.g., a laser source such as a laser diode source, 4 mW) to emit the optical beam. Examples of optical sources can include laser sources such as laser diodes (e.g., 4 mW), light-emitting diodes, fiber laser sources, free-space laser sources or any suitable combination thereof. The LIDAR is also generally equipped with an optical receiver to receive the reflection of the optical beam. The optical receiver can incorporate redirecting optics for suitably redirecting the received reflection and an optical detector to detect the received reflection. The LIDAR typically includes electronics for powering and driving the optical source in a desired regime (e.g., pulsed regime, amplitude or phase modulation regime, frequency sweep regime), electronics for conditioning the signal detected by the optical detector and electronics for processing the detected signal and determining LIDAR measurements.

For instance, an optical source can emit an optical beam towards a first reflector which can reflect the optical beam towards a scene at an elevation angle and can also reflect a reflection of this optical beam, from the scene, at the same elevation angle towards an optical receiver using a second reflector in order to analyze the reflected light.

It was found that there is a need in providing a LIDAR system which not only projects an optical beam and detects its reflection, but also projects an optical beam around the LIDAR system and detects its reflection. Moreover, there is also a need in providing a LIDAR system which can scan the scene using an optical beam selectively projected at more than two different elevation angles.

As will be seen in the next paragraphs, an embodiment of a LIDAR system can use more than one opto-mechanical assemblies mounted to a common shaft of a motor. In another embodiment, the motor may have more than one shafts to which are mounted a respective one of the more than one opto-mechanical assemblies. In an alternate embodiment, there can be more than one motor, each having a respective shaft to which is mounted a respective one of the more than one opto-mechanical assemblies. The embodiment presented herein includes a single motor having a shaft shared by the more than one opto-mechanical assemblies, a construction which was found to provide both simplicity and effectiveness. The instantaneous rotation speed of the motor may be measured using a speed sensor (e.g., using the Hall effect) positioned inside the motor.

Figure 10B:
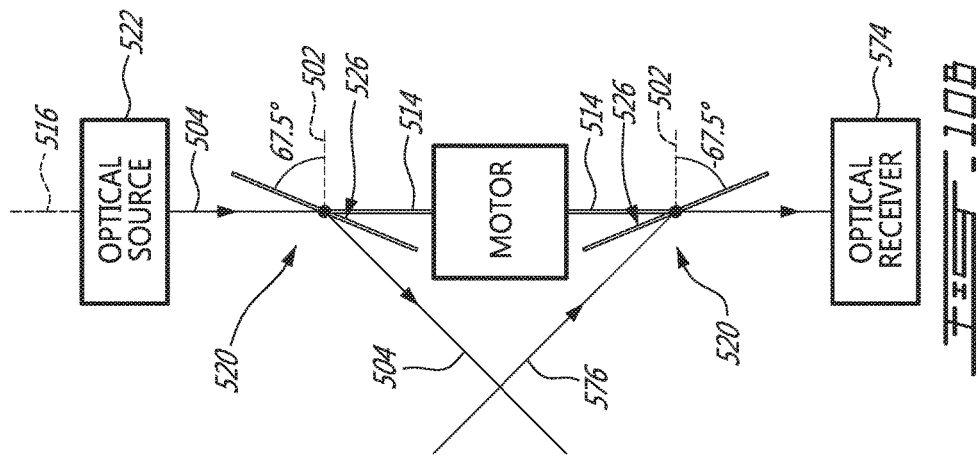
FIGS. 10A and 10B are schematic views of a LIDAR having two identical opto-mechanical assemblies mounted to the shaft of a motor, wherein the two identical opto-mechanical assemblies are in a second position in FIG. 10A and in a rest position in FIG. 10B.
Figure 10A:
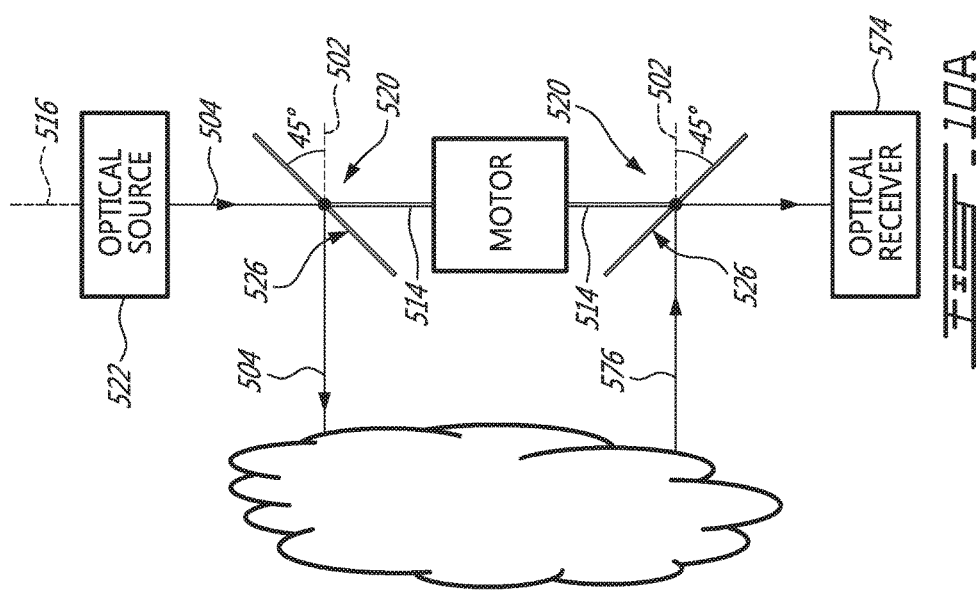

Reference is now made to FIGS. 10A and 10B. In this embodiment, two identical opto-mechanical assemblies 520 as described herein are mounted on a shaft 514 for rotating at the same rotation speed about a rotation axis 516. Like elements will bear like reference numerals, but in the 500 series.

As depicted, an optical source 522 is configured to emit an optical beam 504 along the rotation axis 516 towards a reflector assembly 526 of one of the two opto-mechanical assemblies 520, and an optical receiver 574 is configured to receive a reflection 576 of the optical beam 504 reflected by a reflector assembly 526 of the other one of the two opto-mechanical assemblies 520 and along the rotation axis 516.

As illustrated in FIG. 10A, when the reflector assemblies 526 are in their respective second position (reflector angles of 45° and −45° relative to the reference plane 502 perpendicular with the rotation axis 516), the optical beam 504 is reflected at an elevation angle of 0° while the reflection 576 of this optical beam 504 that is detected by the optical receiver 574 also comes from the same elevation angle (i.e. 0°).

However, as shown in FIG. 10B, when the reflector assemblies 526 are in their respective rest position (reflector angles α of 67.5° and −67.5° relative to the reference plane 502), the optical beam 504 is projected at an elevation angle of −45° (below the reference plane 502) while the reflection 576 that is detected also comes from an elevation of +45° (above the reference plane 502).

Such a lack of parallelism between the projected portion of the optical beam 504 and the impinging portion of the reflection 576 may be an issue.

Figure 11:
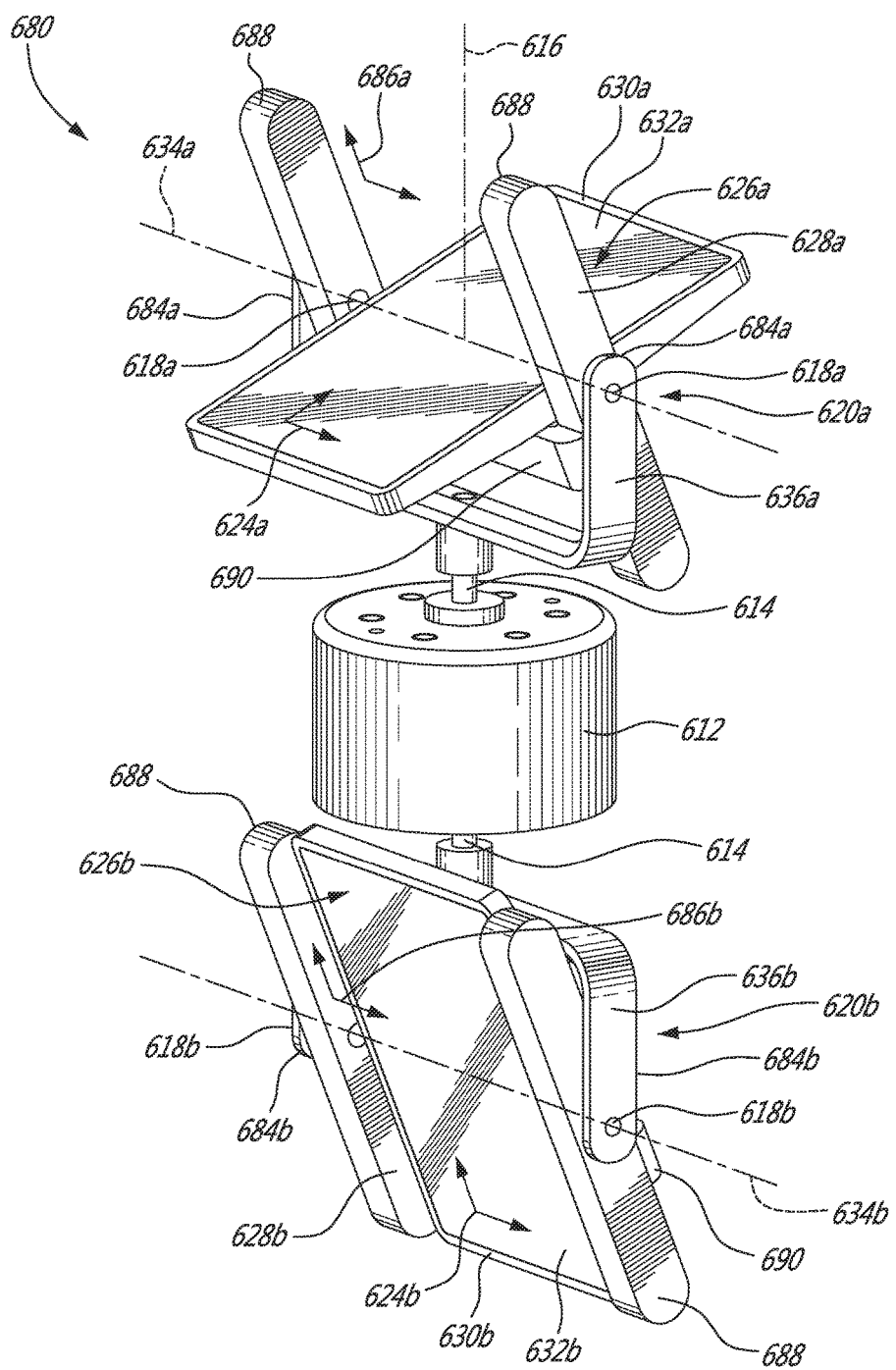
FIG. 11 is an oblique view of examples first and second reflector assemblies pivotally mounted to the shaft of a motor, wherein the first and second reflector assemblies collectively pivot in a same orientation between a rest position and a second position.

FIG. 11 shows an example of a portion 680 of a LIDAR system which can address this issue. Like elements will bear like reference numerals, but in the 600 series. As depicted, a first opto-mechanical assembly 620a and a second opto-mechanical assembly 620b are provided in this example. For simplicity, the terms "first" and "second" will be used to refer to parts of a respective one of the first and second opto-mechanical assemblies 620a and 620b. Both the first and second opto-mechanical assemblies 620a and 620b are mounted to the shaft 614 of the motor 612 for rotation about the rotation axis 616.

The first opto-mechanical assembly 620a has the first structure 636a to which is pivotally mounted a first reflector assembly 626a via the first pivot joint 618a. In this case, the first structure 636a has a U-shape defining two prongs 684a between which a first pivot axis 634a extends and to which are mounted the first pivot joint 618a on each side of the first reflector assembly 626a. The first reflector assembly 626a has a first body 628a and a first reflector receiver 630a mounted to the first body 628a and which receives a first reflector 632a along a first reflector plane 624a parallel to the first pivot axis 634a. The first body 628a extends in a first body plane 686a which is perpendicular to the reflector plane 624a.

Similarly, the second optical device 620b has a second structure 636b to which is pivotally mounted a second reflector assembly 626b via another pivot joint 618b. In this example, the second structure 636b has the same U-shape defining two prongs 684b between which a second pivot axis 634b extends and to which are mounted the pivot joint 618b on each side of the first reflector assembly 626b. The second reflector assembly 626b has a second body 628b and a second reflector receiver 630b mounted to the second body 628b and which receives a second reflector 632b along a second reflector plane 624b parallel to the second pivot axis 634b. The second body 628b extends in a second body plane 686b which is parallel to the second reflector plane 624b.

As shown, the first and second bodies 628a and 628b each have a H-shape with two flanges 688 interconnected with a web 690. Each of the first and second reflector receivers 630a and 630b is mounted to a respective one of the webs 690 of the first and second bodies 628a and 628b and extends between their respective flanges 688.

As it will be understood, the first and second opto-mechanical assemblies 620a and 620b are configured to maintain parallelism between the projected optical beam and the detected reflection of that optical beam when the first and second reflector assemblies 626a and 626b are in the rest position and when the first and second reflector assemblies 626a and 626b are in the second position. In other words, the reflector angles are mechanically controlled to maintain communication of an optical signal between the optical source and the optical receiver, notwithstanding the position of the first and second reflector assemblies 626a and 626b. Mechanical control of the parallelism between the projected optical beam and the detected reflection can be achieved by suitably selecting pivot joints (and associated spring constants), the shape and moment of inertia of the bodies, etc.

To do so, the first and second reflector planes 624a and 624b are positioned perpendicular to one another in the rest and the other position(s), and the first and second bodies 628a and 628b each have a moment of inertia which allow them to pivot simultaneously in a same rotational direction about a respective one of the first and second pivot axis 634a and 634b.

The moments of inertia of the first and second bodies 628a and 628b are oriented in a substantially parallel manner when the first and second opto-mechanical assemblies 620a and 620b are mounted to the shaft 614.

In this example, it is considered that the first and second bodies 628a and 628b each have a moment of inertia relative to the rotation axis 616 which is substantially greater than a moment of inertia of the reflector receiver and the reflector combined to one another. Indeed, keeping the moments of inertia of the reflector receivers and the reflectors relatively low compared to that of the first and second bodies 628a and 628b can be useful. Indeed, the reflector receiver may be made of a light material (e.g., a thermoplastic) for that purpose whereas the inertial bodies can be made of heavy material (e.g., alloy steel or steel).

Figure 12A:
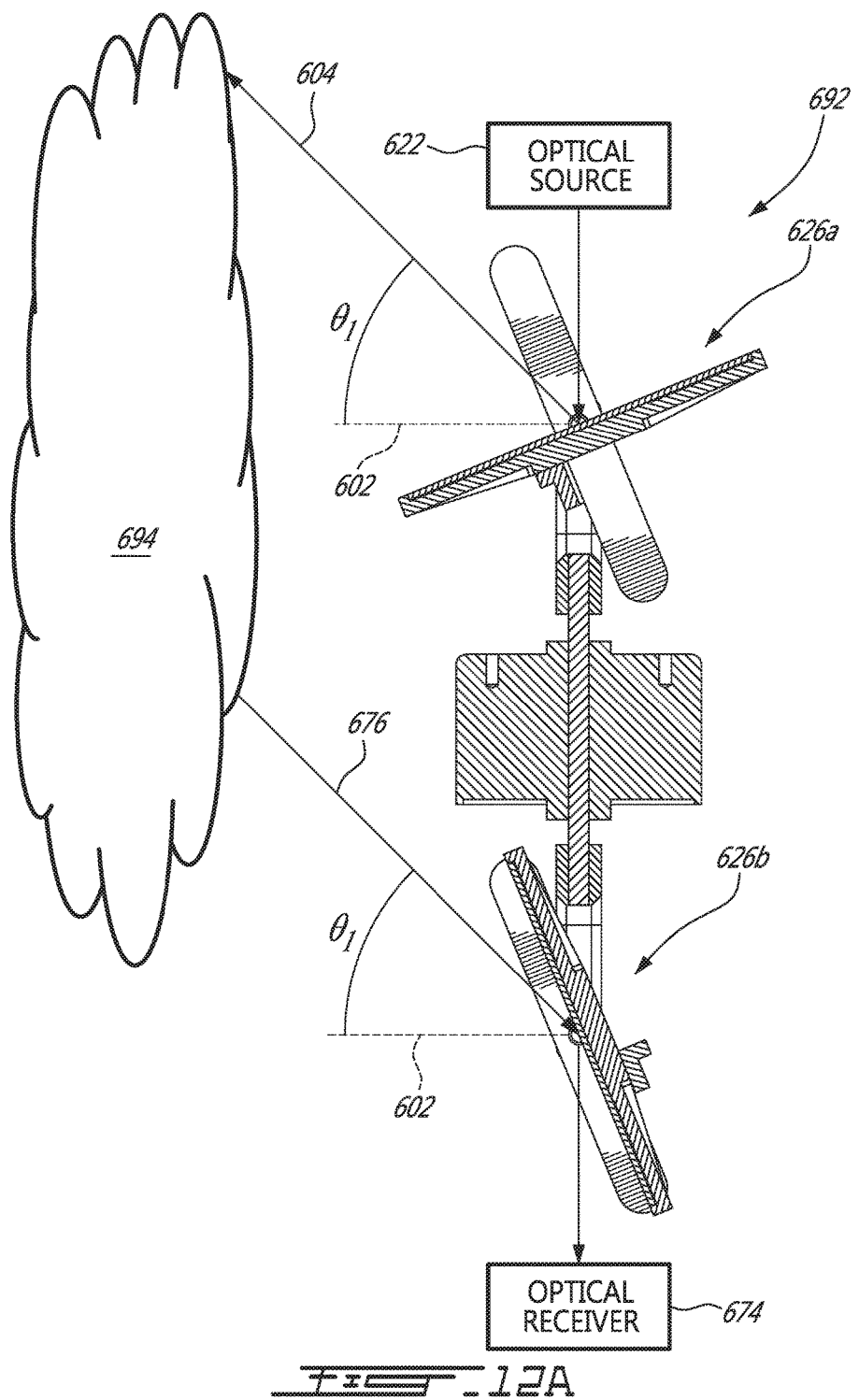
FIG. 12A is a sectional view of the LIDAR system of FIG. 11 showing the first and second reflector assemblies in a rest position.

FIGS. 12A and 12B show an example of a LIDAR system 692 that can project an optical beam 604 towards a scene 694 and detect a reflection 676 of that optical beam 604 at any elevation angle θ. More specifically, the LIDAR system 692 incorporates the first and second reflector assemblies 626a and 626b which are provided between the optical source 622 and the optical receiver 674.

As illustrated, FIG. 12A shows the first and second reflector assemblies 626a and 626b in the rest position and FIG. 12B shows the first and second reflector assemblies 626a and 626b in the second position wherein the first and second reflector planes 624a and 624b are perpendicular to one another in any position. The elevation angle θ of the first reflector assembly 626a relative to the reference plane 602 corresponds to that of the second reflector assembly 626a in both the rest and the other position(s).

In an embodiment, the mass of the combination of the reflector receiver and the reflector is smaller (e.g., about 3 g) than the mass of a first (or second) body (e.g., about 15 g). However, since the reflector receiver and the reflector are oriented differently in the first reflector assembly than in the second reflector assembly, the moment of inertia of the first reflector assembly 626a can differ from the moment of inertia of the second reflector assembly 626b. Accordingly, two different reflector assemblies can be pivoted from the rest position to the second position at different moments in time given they experience a same rotation speed increase. To compensate this difference, in an embodiment, an eccentric weight can be mounted on either one of the first and second reflector assemblies. In another embodiment, modifying the stiffness constant of the biased pivot joints of the first and second reflector assemblies has been found convenient to compensate for the difference in the moments of inertia of between the first and second reflector assemblies. In still another embodiment, the biased pivot joints of the first and second reflector assemblies have the same stiffness constant. However, in this specific embodiment, the two biased pivot joints are biased differently upon installation. More specifically, in the embodiment shown in FIGS. 12A-B, the torsion spring of the biased pivot joint of the second reflector assembly 626b has a preload value which exceeds a preload value of the torsion spring of the first reflector assembly 626a. In this latter embodiment, the torsion springs of the biased pivot joints of the first and second reflector assemblies 626a and 626b, each having a common stiffness constant (e.g., 0.002 in·lbf/°), each allows a respective one of the first and second reflector assemblies 626a and 626b to pivot simultaneously when they experience a same rotation speed increase. For instance, in this embodiment, the torsion spring of the biased pivot joint of the first reflector assembly 626a is preloaded with 100° whereas the torsion spring of the biased pivot joint of the second reflector assembly 626b is preloaded with 200°.

Figure 13:
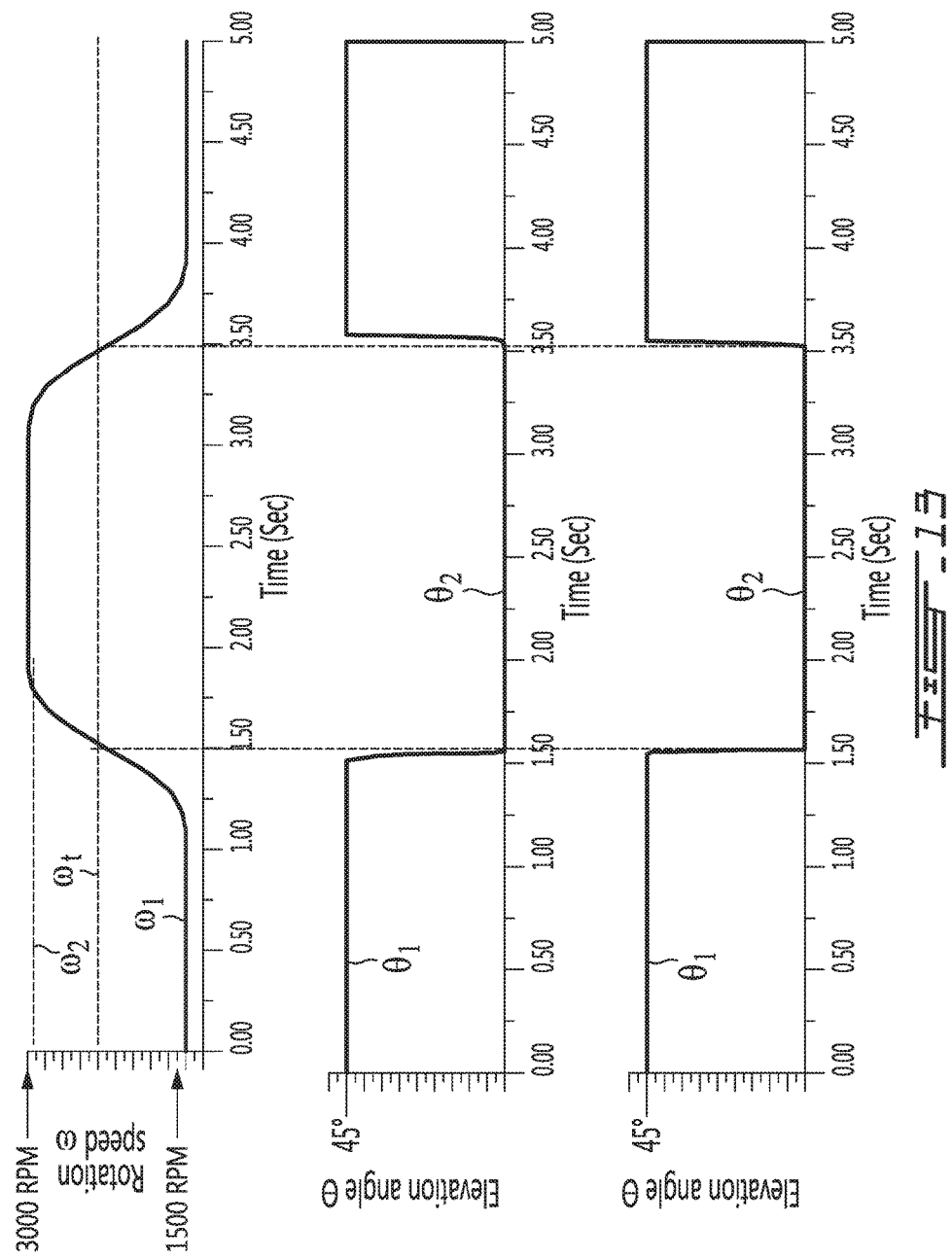
FIG. 13 is a combination of three graphs showing the relationship between the rotation speed and the elevation angles associated to the first and second reflector assemblies of FIG. 11 as a function of time.

FIG. 13 represents graphs showing that, upon varying a rotation speed (here in rotation per minute (RPM) units) of the reflector assembly, elevation angles of the projected optical beam and of the detected optical beam can be pivoted between the rest position ($\theta_1=45°$) to the second position ($\theta_2=0°$) accordingly. More specifically, past the first second of this experiment, the rotation speed is increased from a first rotation speed $\omega_1$ of 1500 RPM to a second rotation speed $\omega_2$ of 3000 RPM, wherein the rotation speed threshold $\omega_t$ is about 1800 RPM in this example. Past the rotation speed threshold $\omega_t$, the first and second reflector assemblies pivot from their respective rest and other position from the first elevation angle $\theta_1$ to the second elevation angle $\theta_2$. Past the third second of this experiment, the rotation speed is decreased from 3000 RPM to 1500 RPM which causes the first and second reflector assemblies to pivot from their respective other positions back to their respective rest positions.

Figure 14:
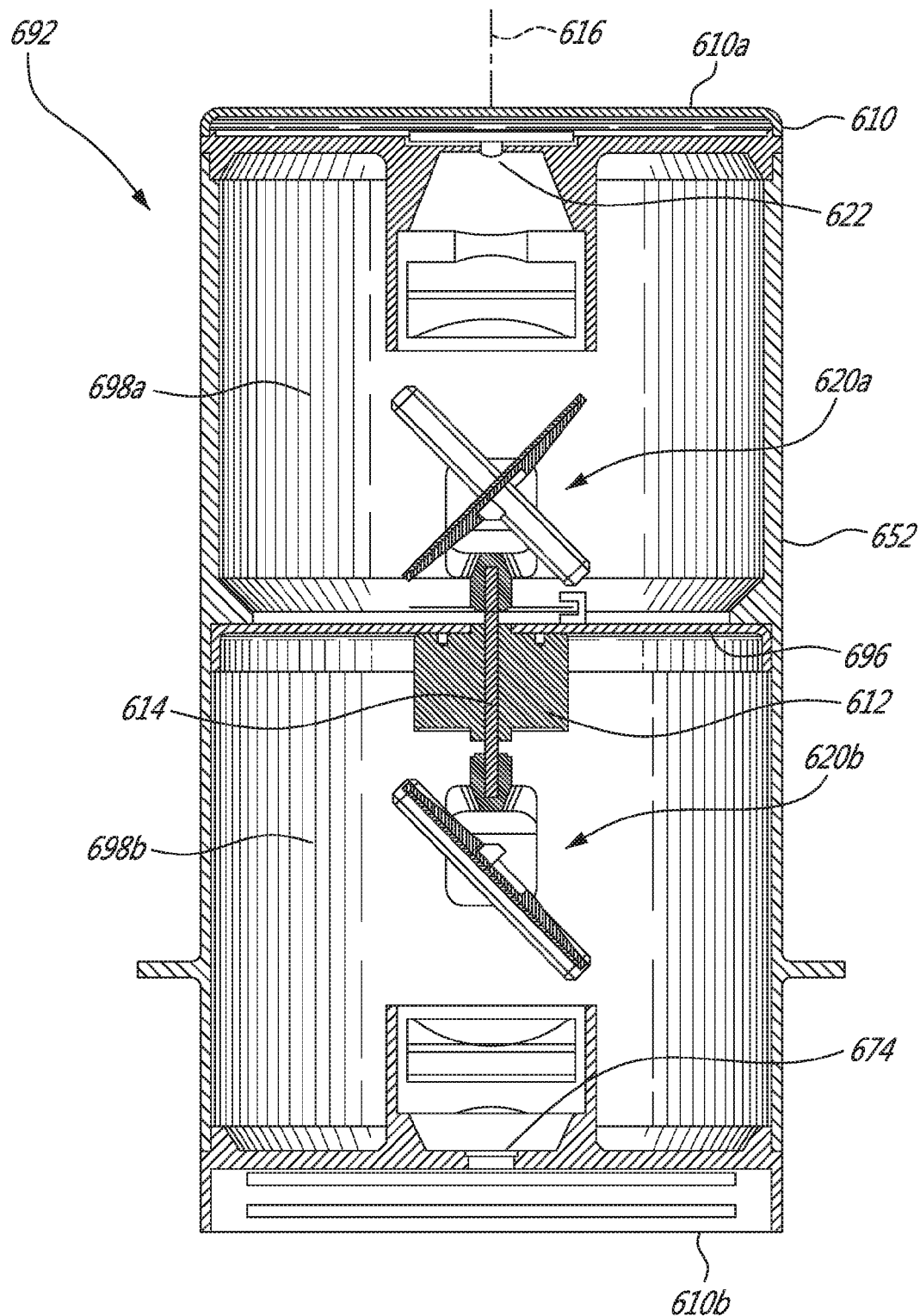
FIG. 14 is a sectional view of the first and second reflector assemblies of FIG. 11 mounted within a housing, in accordance with an example embodiment.

FIG. 14 shows the LIDAR system 692 in full. As it can be seen, it incorporates the first and second opto-mechanical assemblies 620a and 620b shown in FIG. 12A. As shown, the LIDAR system has the housing 610 having a shape extending along the rotation axis 616. The housing 610 has a substantially cylindrical shape, a first end 610a and a second opposite end 610b between which extends the lateral wall 652.

A median support member 696 is secured in the middle of the lateral wall 652 of the housing 610 and thus defines two sub cavities 698a and 698b. The median support member 696 has a center opening. The median support member 696 can be made integral to the lateral wall 652 of the housing 610. The LIDAR system 692 has the motor 612 mounted to the housing 610, and more specifically to the median support member 696. A shaft 614 of the motor 612 is rotatably received in the center opening such that the shaft 614 extends in the two sub cavities 698a and 698b of the housing 610.

In this embodiment, the optical source 622 is mounted proximate to the first end 610a of the housing 610 via a first optical support. The first optical support can have a shape adapted to the type of optical source used. Any suitable optical source can be used in the LIDAR system. In this example, the optical source 622 is provided in the form of a vertical-cavity surface-emitting laser (VCSEL). Satisfactory refractive optics are also provided at the optical source to refract the emitted optical beam as desired.

The optical receiver 674 is mounted proximate to the second end 610b of the housing 610 via a second optical support. The second optical support can have any suitable shape. In this embodiment, the optical receiver includes redirecting optics and an optical detector provided in the form of a silicon photodiode. However, it will be understood that any suitable type of optical detector can be used. For instance, the optical detector can be a CCD sensor. The redirecting optics can include refractive optics to refract the reflection of the optical beam as desired.

In some other embodiments, the first and second reflector assemblies are both provided in the form of a single reflector assembly. One specific example of these embodiments includes a body having a rectangular triangle profile wherein two perpendicular sides of the rectangular triangle profile each extends to form a respective one of first and second reflectors. When the body is in the rest position, the rotation axis extends through the first and second reflectors such that the first and second reflectors both form a 45° angle with the rotation axis. The pivot axis is chosen to be perpendicular to the rectangular triangle profile in addition to be off-centre towards an apex of the rectangular triangle profile. In this way, when the body rotates at a rotation speed below the rotation speed threshold, an optical beam projected from an optical source and along the rotation axis towards the first reflector can be reflected at a first elevation angle towards a surrounding environment. Simultaneously, the second reflector can receive an optical beam at the first elevation angle from the surrounding environment and reflect it along the rotation axis and towards an optical receiver. However, when the body rotates at a rotation speed exceeding the rotation speed threshold, an optical beam projected from the optical source and along the rotation axis towards the first reflector can be reflected at a second elevation angle towards the surrounding environment. Simultaneously, the second reflector can receive an optical beam at the second elevation angle from the surrounding environment and reflect it along the rotation axis and towards the optical receiver. In some embodiments, the body can have an inhomogeneous mass distribution such that more mass is provided near the apex of the rectangular triangle profile to provide a satisfactory moment of inertia upon rotation.

It is understood that a rotary scanner, during use, performs a step of modifying an elevation angle of an optical beam. As described above, the elevation angle can be described relative to a reference plane. This method has a step of biasing a reflector assembly at a first reflector angle relative to the reference plane; a step of rotating the reflector assembly at a first rotation speed about a rotation axis perpendicular to the reference plane. The step of biasing causing the reflector assembly to maintain the first reflector angle during said rotating. The method has a step of emitting the optical beam towards the rotating reflector assembly thereby projecting the beam at a first elevation angle therearound when the reflector assembly is biased at the first reflector angle; and a step of modifying said rotating to rotate the reflector assembly at a second rotation speed, said modifying causing the reflector assembly to pivot from the first reflector angle to a second reflector angle and the elevation angle of the optical beam to be modified to a second elevation angle.

As mentioned above, in some embodiments, the opto-mechanical assembly can include a structure with a plurality of incrementally-spaced stoppers. In these embodiments, increasing the rotation speed of the opto-mechanical assembly above a second rotation speed threshold can cause the reflector assembly to move from the second position to a third position and so forth.

Figure 15:
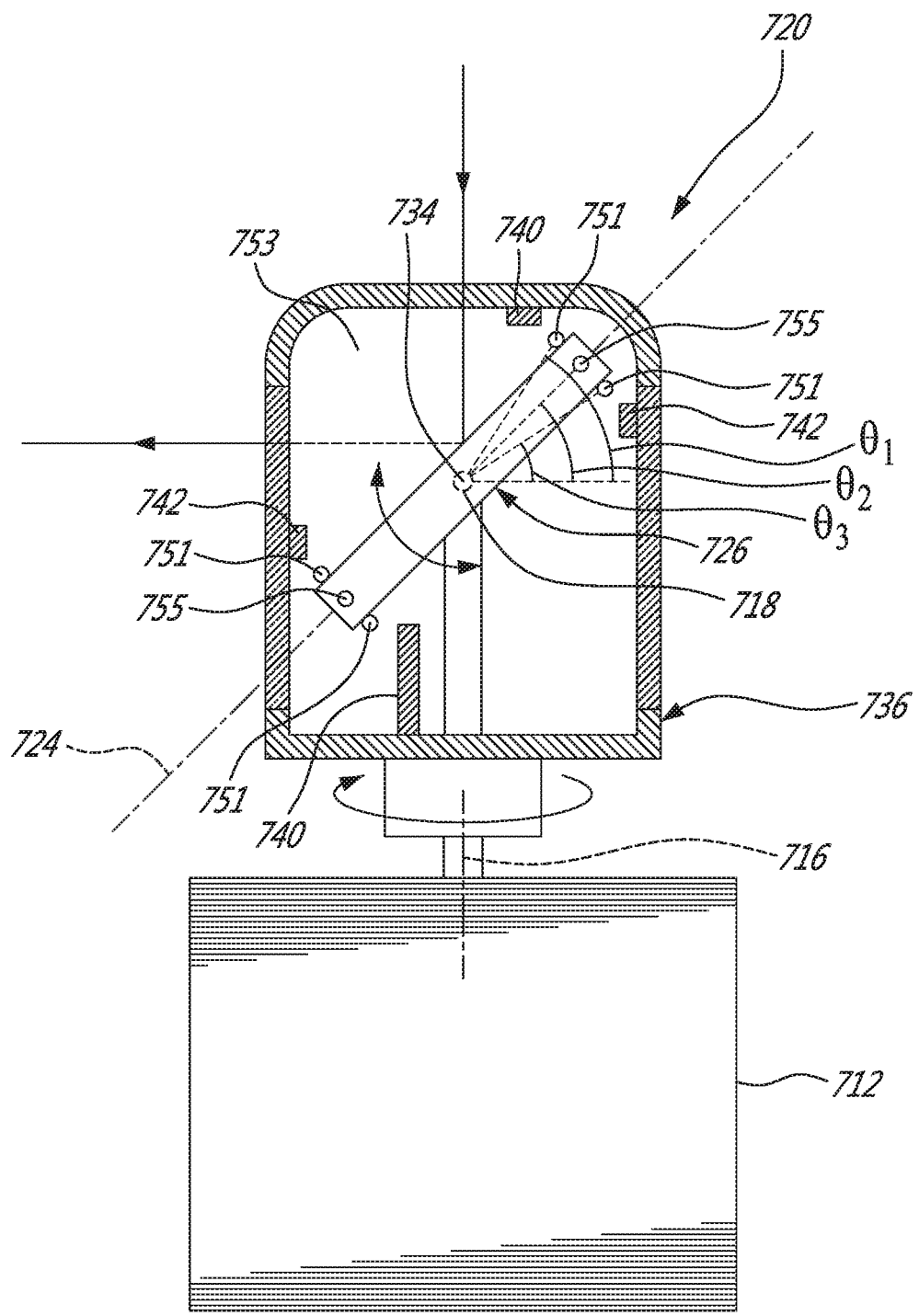
FIG. 15 is a sectional view of another example of an opto-mechanical assembly, incorporating a plurality of incrementally-spaced stoppers, in accordance with an embodiment.

FIG. 15 shows an example of such an opto-mechanical assembly 720. As depicted, the opto-mechanical assembly 720 has a rotation axis 716, and a structure 736 which is mounted to a motor 712 for rotation about the rotation axis 716. The opto-mechanical assembly 720 also has a reflector assembly 726 which is pivotally mounted to the structure 736 via a biased pivot joint 718. The biased pivot joint 718 has a pivot axis 734 which is perpendicular to the rotation axis 716. The reflector assembly 726 has a reflector plane 724 which is parallel to the pivot axis 734.

As can be understood, a centrifugal force acting on the reflector assembly 726 overcomes a biasing force of the biased pivot joint 718 to pivot the reflector assembly 726 from a rest position to at least one of a plurality of other positions when the structure 736 rotates at a rotation speed exceeding a corresponding one of a plurality of rotation speed thresholds. In this way, the reflector plane 724 can form one of a plurality of different angles $\theta_1$, $\theta_2$ and $\theta_3$ relative to the rotation axis 716 whether the reflector assembly 726 is in the rest position or in any of the other positions.

The structure 736 can be provided with a plurality of intermediate indexes used to control the position of the reflector assembly 726 relative to the structure 736. For instance, in this embodiment, the structure 736 has a plurality of spaced-apart structure magnets 751 provided at an internal surface 753 of the structure 736 wherein each of the spaced-apart structure magnets 751 are associated with a corresponding one of the rest angle (i.e., angle $\theta_1$) and two other angles (i.e., $\theta_2$ and $\theta_3$). The reflector assembly 726 also has a reflector magnet 755 mounted thereto and which faces the internal surface 753 of the structure 736 and more specifically which faces either one of the structure magnets 751. In this way, the reflector magnet 755 can magnetically engage with one of the plurality of spaced-apart structure magnets 751 to maintain the reflector assembly 726 in one of the angles $\theta_1$, $\theta_2$ and $\theta_3$ by modifying the rotation speed of the structure 736. As can be seen in this example, a first set of structure magnets 751 and a reflector magnet 755 are provided at one distal end of the reflector assembly 726 and a second set of structure magnets 751 and another reflector magnet 755 are provided at the other distal end of the reflector assembly 726.

The structure 736 is provided with first stoppers 740 inwardly protruding from the structure 736 and towards the reflector assembly 726 to maintain it in the rest position when the rotation speed ω of the opto-mechanical assembly 720 is equal or less than the rotation speed threshold. In this embodiment, the structure 736 is provided with second stoppers 742 which inwardly protrude from the structure 736 and towards the reflector assembly 726 to maintain it in the other angle $\theta_3$ when the rotation speed ω of the opto-mechanical assembly 220 exceeds a given rotation speed threshold.

Accordingly, a plurality of guiding magnets inwardly provided around the structure can also be used to provide the intermediate indexes. It is noted that the biased joint can be provided with a progressively increasing stiffness function. In these embodiments, with such a progressively increasing stiffness function, the reflector assembly can be maintained at a given angle $\theta_i$ when the rotation speed of the structure is comprised within a first interval, at a given angle $\theta_{i+1}$ when the rotation speed of the structure is comprised within a second interval different from the first interval and so forth.

It will be noted that in some embodiments the mathematical relationship between the rotation speed and the angle can vary in a non-linear fashion. In these cases, the non-linear mathematical relationship can be linearized to satisfactorily allow direct control on the position of the reflector assembly as a function of the rotation speed. To achieve such a linearization, the biased pivot joint is designed to have a non-linear stiffness response which can compensate the non-linearity mentioned above. Linearizing the mathematical relationship between the rotation speed and the angle of the reflector assembly can be performed in many different ways. For instance, in some embodiments, the biased pivot joint includes custom springs (e.g., made of polymer or elastomers) which have a non-linear stiffness response. In some other embodiments, the springs of the biased pivot joint are positioned in such a way that the springs react in a non-linear fashion in response to the centrifugal force. In some alternate embodiments, the springs can be connected to a tie rod in such a way that the springs react in the desired manner. In still some other embodiments, the non-linear mathematical relation can be obtained using lamellar springs configured in series which would engage with one another progressively.

As can be understood, the examples described above and illustrated are intended to be exemplary only. For instance, although a discrete transition of the reflector assembly between the rest position and the second position has been described in full, a continuous transition (e.g., parabolic) of the reflector assembly between a rest position and a plurality of other positions can also be used. Accordingly, pivoting the reflector assembly from any of the positions can be allowed by careful selection of the rotation speed of the opto-mechanical assembly. In alternate embodiments, the structure is directly mounted to the shaft whereas in other embodiments, the structure is indirectly mounted to the shaft. In some embodiments, the shaft to which is mounted the structure is directly rotatable by the motor or more specifically, a DC motor. However, in some other embodiments, the shaft to which is mounted the structure is rotatable by an independent shaft of the motor via a pulley and belt assembly or any other suitable driving assemblies. In the latter embodiments, the two shafts are parallel to one another. Regarding the motor, it is intended that the motor can be either mounted inside the housing or provided externally to the housing. In some embodiments, the motor is a hollow shaft brushless motor, a direct drive motor and the like. In the case the motor is a hollow shaft brushless motor, the opto-mechanical assembly can be mounted inside the hollow shaft of the hollow shaft brushless motor. In alternate embodiments, the pivot joint includes two biasing members wherein each of the two biasing members pivotally mounts a respective side of the reflector assembly to the structure and biases the reflector assembly to the rest angle. In these embodiments, the structure can have a substantially U-shape which defines two prongs between which the pivot axis extends and to which are mounted the two biasing members. However, in some other alternate embodiments, the pivot joint includes a single biasing member which pivotally mounts a side of the reflector assembly to the structure and which biases the reflector assembly to the rest angle. In these latter embodiments, the structure can have a substantially L-shape which defines a single prong receiving the pivot axis and to which is mounted the single biasing member. The reflector assembly is meant to encompass any type of optical assemblies (e.g., reflective assemblies, refractive assemblies). Further, it is noted that although the reflector has been shown to be flat in the illustrated embodiments, the reflector can also be curved, spherical, aspherical, cylindrical, acylindrical or shaped into any other suitable shape in some other embodiments. In these cases, the reflector plane can be defined based on the perimeter of the corresponding reflector. Also, it is contemplated that the reflector can be provided in the form of a prism, a diffraction grating, a dichroic filter, a beam splitter, a holographic element, a reflective wedge or any other suitable reflector. In an embodiment where the reflector is provided in the form of a diffraction grating, a plurality of optical beams can be projected therearound at different angles simultaneously. Although the reflector assembly is biased to the rest angle by the pivot joint in this illustrated example, the reflector assembly can also be biased to the rest angle by a spring, e.g., an extension or a linear helicoidal spring, having an end connected to the reflector assembly and spaced from the pivot axis, and another end connected to the structure. In this latter embodiment, the extension spring pulls the reflector assembly to the rest angle and, under a sufficient centrifugal force, lets the reflector assembly leave the rest angle and reach the second angle. The scope is indicated by the appended claims.

What is claimed is:

1. A rotary scanner comprising:
    a housing;
    a motor fixedly mounted relative to the housing;
    a structure being rotatably mounted to the housing so as to be rotatable about a rotation axis by the motor during use;
    a reflector assembly being mounted to the structure via a pivot joint so as to be pivotable around a pivot axis between a rest angle and at least one other angle, the reflector assembly being biased to the rest angle, the pivot axis being perpendicular to the rotation axis, the reflector assembly having a reflector plane parallel to the pivot axis, the reflector assembly having a body, a reflector receiver and a reflector received in the reflector receiver, the body having a moment of inertia relative to the rotation axis which is substantially greater than a moment of inertia of both the reflector receiver and the reflector;
    an optical source fixedly mounted relative to the housing and being operable to emit an optical beam along the rotation axis and towards the reflector assembly during use; and
    a control interface being configured to control a rotation speed of the motor between a first rotation speed and at least one other rotation speed, the reflector assembly being configured to remain biased to the rest angle when the rotation speed of the motor is the first rotation speed and being configured to pivot from the rest angle to the at least one other angle when the rotation speed of the motor is the at least one other rotation speed.

2. The rotary scanner of claim 1 wherein the reflector assembly is biased to the rest angle by the pivot joint, the pivot joint including at least one biasing member being configured for pivotally mounting the reflector assembly to the structure and being configured for biasing the reflector assembly to the rest angle.

3. The rotary scanner of claim 2 wherein the biasing member is provided in the form of a spring.

4. The rotary scanner of claim 2 wherein the at least one biasing member includes two biasing members each being configured for pivotally mounting a respective side of the reflector assembly to the structure and being configured for biasing the reflector assembly to the rest angle, the structure having a substantially U-shape defining two prongs between which the pivot axis extends and to which are mounted the two biasing members.

5. The rotary scanner of claim 1 wherein the body extends in a body plane substantially perpendicular to the reflector plane.

6. The rotary scanner of claim 1 wherein the body has a H-shape having two flanges interconnected with a web, the reflector receiver being mounted at least to the web and extending between the two flanges.

7. The rotary scanner of claim 1 wherein the structure has a first stopper inwardly protruding from the structure and contiguous to the reflector assembly in the rest angle, the structure having a second stopper inwardly protruding from the structure and contiguous to the reflector assembly in a last one of the at least one other angle.

8. The rotary scanner of claim 1 wherein the reflector assembly has at least one peg protruding therefrom and being stoppable by a corresponding one of at least two stoppers of the structure based on the rotation speed of the motor.

9. The rotary scanner of claim 1 wherein the structure has a plurality of spaced-apart structure magnets at an internal surface of the structure, the spaced-apart structure magnets being associated with a corresponding one of the rest angle and the at least one other angle, the reflector assembly having a reflector magnet mounted thereto and facing the internal surface of the structure, the reflector magnet magnetically engaging with one of the plurality of spaced-apart structure magnets to maintain the reflector assembly in one of the rest angle and the at least one other angle as a function of the rotation speed.

10. The rotary scanner of claim 1 wherein the motor is mounted inside the housing, the housing having a window axially extending around a lateral wall of the housing.

11. The rotary scanner of claim 10 wherein the window is made of an optically transparent material.

12. The rotary scanner of claim 1 wherein the reflector assembly is a first reflector assembly, the reflector plane is a first reflector plane and the pivot axis is a first pivot axis, the rotary scanner further comprising:
    an optical receiver fixedly mounted relative to the housing for receiving a reflection of the optical beam along the rotation axis;
    a second structure being rotatably mounted to the housing so as to be rotatable about the rotation axis by the motor during use; and
    a second reflector assembly being mounted to the second structure via a second pivot joint so as to be pivotable around a second pivot axis between the rest angle and the at least one other angle based on the control interface, the second reflector assembly being biased to the rest angle by the second pivot joint, the second pivot axis being perpendicular to the rotation axis and parallel to the first pivot axis, the first and second reflector planes being perpendicular to one another.

13. The rotary scanner of claim 12, wherein each of the first and second reflector assemblies have a different moment of inertia which mechanically maintains the perpendicularity between the first and second reflector planes.

14. The rotary scanner of claim 13, wherein the first and second reflector assemblies each have a respective body extending in a body plane, the body plane of the body of the first reflector assembly being perpendicular to the body plane of the body of the second reflector assembly.

15. A method of modifying an elevation angle of an optical beam rotating about a rotation axis, the elevation angle being relative to a reference plane, the method comprising:
    biasing a reflector assembly at a reflector angle relative to the reference plane, the reflector assembly having a body, a reflector receiver and a reflector received in the reflector receiver, the body having a moment of inertia relative to the rotation axis which is substantially greater than a moment of inertia of both the reflector receiver and the reflector;
    rotating the reflector assembly at a rotation speed about the rotation axis perpendicular to the reference plane, said biasing causing the reflector assembly to maintain the reflector angle during said rotating;
    propagating the optical beam towards the rotating reflector assembly thereby projecting the optical beam at an elevation angle therearound when the reflector assembly is biased at the reflector angle; and
    modifying said rotating to rotate the reflector assembly at at least one other rotation speed, said modifying causing the reflector assembly to pivot from the reflector angle to at least one other reflector angle and the elevation angle of the optical beam to be modified to at least one other elevation angle.

16. An opto-mechanical assembly comprising: a rotation axis; a structure being mountable to a motor for rotation about the rotation axis; and a reflector assembly being pivotally mounted to the structure via a pivot joint and being biased to a rest angle, the pivot joint having a pivot axis being perpendicular to the rotation axis, the reflector assembly having a reflector plane being parallel to the pivot axis, the reflector assembly having a body, a reflector receiver and a reflector received in the reflector receiver, the body having a moment of inertia relative to the rotation axis which is substantially greater than a moment of inertia of both the reflector receiver and the reflector, the reflector assembly being configured to pivot from the rest angle to at least one other angle when a rotation speed of the structure exceeds a rotation speed threshold, the reflector plane forming a different angle relative to the rotation axis whether the reflector assembly is in the rest angle or in the at least one other angle.

17. A rotary projector comprising the opto-mechanical assembly of claim 16 and an optical source mounted fixedly relative to the rotation axis, the optical source being operable to emit an optical beam along the rotation axis and towards the reflector assembly during use.

18. A rotary receiver comprising the opto-mechanical assembly of claim 16 and an optical receiver mounted fixedly relative to the rotation axis, the reflector assembly being configured to receive light from a surrounding environment and to reflect the received light along the rotation axis and towards the optical receiver during use.

* * * * *